(12) United States Patent
Zhang

(10) Patent No.: US 12,198,427 B2
(45) Date of Patent: Jan. 14, 2025

(54) ATTENTION-BASED CONTENT VISUALIZATION FOR AN EXTENDED REALITY ENVIRONMENT

(71) Applicant: META PLATFORMS TECHNOLOGIES, LLC, Menlo Park, CA (US)

(72) Inventor: Ting Zhang, Bellevue, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 130 days.

(21) Appl. No.: 18/064,749

(22) Filed: Dec. 12, 2022

(65) Prior Publication Data

US 2023/0316671 A1    Oct. 5, 2023

Related U.S. Application Data

(60) Provisional application No. 63/362,112, filed on Mar. 29, 2022.

(51) Int. Cl.
*G06V 20/20*     (2022.01)
*G06T 19/00*     (2011.01)
(Continued)

(52) U.S. Cl.
CPC ............ *G06V 20/20* (2022.01); *G06T 19/006* (2013.01); *G06V 10/25* (2022.01); *G06V 10/764* (2022.01);
(Continued)

(58) Field of Classification Search
CPC ...... G06V 20/20; G06V 10/764; G06V 10/25; G06V 10/7715; G06T 19/006; G06T 2200/24
See application file for complete search history.

(56) References Cited

U.S. PATENT DOCUMENTS 10,909,405 B1    2/2021  Golard et al.
2023/0144091 A1*  5/2023  Forutanpour ........... G06F 3/013
                                                          345/156
(Continued)

OTHER PUBLICATIONS

International Patent Application No. PCT/US2023/016534, International Search Report and Written Opinion mailed Jun. 30, 2023, 14 pages.

*Primary Examiner* — Phi Hoang
(74) *Attorney, Agent, or Firm* — Kilpatrick Townsend & Stockton LLP

(57) ABSTRACT

Techniques for adaptively visualizing content in an artificial environment based on the attention of a user. In one particular aspect, a computer-implemented method is provided that includes obtaining input data from a user, inferring content that is of interest to the user based on features gathered from the user's attention in the input data, identifying virtual content data based on the content that is of interest to the user, determining modifications to be applied to the virtual content data based on relevancy, applying the modifications to the virtual content data to generate a final format for the virtual content data, and rendering virtual content in the extended reality environment displayed to the user based on the final format for the virtual content data. The virtual content rendered from relevant virtual content data is more prominently displayed as compared to the virtual content rendered from semi-relevant and non-relevant virtual content data.

20 Claims, 19 Drawing Sheets

(51) Int. Cl.
*G06V 10/25* (2022.01)
*G06V 10/764* (2022.01)
*G06V 10/77* (2022.01)

(52) U.S. Cl.
CPC ...... *G06V 10/7715* (2022.01); *G06T 2200/24* (2013.01)

(56) References Cited

U.S. PATENT DOCUMENTS

| | | | | |
|---|---|---|---|---|
| 2023/0237636 A1* | 7/2023 | Osunkwo | ............... | G06T 7/0004 382/141 |
| 2023/0315969 A1* | 10/2023 | Religa | ................... | G06F 40/258 715/202 |

* cited by examiner

ATTENTION-BASED CONTENT VISUALIZATION FOR AN EXTENDED REALITY ENVIRONMENT

CROSS-REFERENCE TO RELATED APPLICATIONS

The present application is a non-provisional application of and claims the benefit and priority under 35 U.S.C. 119(e) of U.S. Provisional Application No. 63/362,112, filed Mar. 29, 2022, the entire contents of which is incorporated herein by reference for all purposes.

FIELD

The present disclosure relates generally to content visualization in an extended reality environment, and more particularly, to techniques for adaptively visualizing content in an artificial environment based on the attention of a user.

BACKGROUND

Extended reality is a form of reality that has been adjusted in some manner before presentation to a user, which may include, e.g., a virtual reality (VR), an augmented reality (AR), a mixed reality (MR), a hybrid reality, or some combination and/or derivatives thereof. Extended reality content may include completely generated virtual content or generated virtual content combined with physical content (e.g., physical or real-world objects). The extended reality content may include digital images or animation, text, video, audio, haptic feedback, or some combination thereof, and any of which may be presented in a single channel or in multiple channels (such as stereo video that produces a three-dimensional effect to the viewer). Extended reality may be associated with applications, products, accessories, services, or some combination thereof, that are, e.g., used to create content in an extended reality and/or used in (e.g., perform activities in) an extended reality. The extended reality system that provides such content may be implemented on various platforms, including a head-mounted display (HMD) connected to a host computer system, a standalone HMD, a mobile device or computing system, or any other hardware platform capable of providing extended reality content to one or more viewers.

Extended reality systems have enormous potential in the manner in which content is provided to users. However, developers of extended reality systems are continually challenged to deliver value and convenience to users by, for example, providing content in a compelling and efficient manner for an array of extended reality services such as medical training, retail product offering, repair or maintenance services, military training and readiness, edutainment, entertainment, and the like. For example, often user interfaces associated with these services do not or cannot provide adequate or complete information to a user's device, particularly when the device is a mobile device (e.g., mobile augmented reality system) capable of traversing a large physical environment having a large quantity and range of information that can be displayed to a user. In other cases, the user interfaces may be presented in a way that limits the usability of the presented content for a user. For example, users may not be able to understand the significance of information or objects displayed on the device because the interface is cluttered with too much information and/or objects (e.g., points of interest). Thus, users are unable to fully utilize the available functions of the services because the interface may be difficult or cumbersome to use. Accordingly, developers face significant technical challenges in providing user interfaces that present content in ways that can be more easily and quickly understood by the user.

BRIEF SUMMARY

Techniques disclosed herein relate generally to content visualization in an extended reality environment. More specifically and without limitation, techniques disclosed herein relate to adaptively visualizing content in an artificial environment based on the attention of a user. For example, minimizing a size of an augment icon or application that is not important to a user at the present time versus maximizing a size of an augment icon or application that is important to the user at the present time to a user. This is particularly applicable in instances where the surrounding environment contains many objects for which augments or information may be relayed to users and instances where multiple interactions are available for execution.

In various embodiments, a computer-implemented method is provided that includes: obtaining input data from a user, wherein the input data includes a sequence of perceptions from a egocentric vision of the user, inferring, by rule-based artificial intelligence, machine learning based artificial intelligence, or a combination thereof, content that is of interest to the user based on features gathered from the user's attention in the input data, identifying a set of virtual content data comprising relevant virtual content data, semi-relevant virtual content data, non-relevant virtual content data, or a combination thereof based on the content that is of interest to the user, determining modifications to be applied to the relevant virtual content data, the semi-relevant virtual content data, the non-relevant virtual content data, or a combination thereof based on relevancy of the virtual content data, applying the modifications to the relevant virtual content data, the semi-relevant virtual content data, the non-relevant virtual content data, or a combination thereof in order to generate a final format for the set of virtual content, and rendering virtual content in an extended reality environment displayed to the user based on the final format for the set of virtual content, wherein the virtual content rendered from the relevant virtual content data is more prominently displayed as compared to the virtual content rendered from the semi-relevant virtual content data and the non-relevant virtual content data.

In some embodiments, the inferring is implemented by the machine learning based artificial intelligence performing two prediction tasks: (i) a probability that the user may interact with virtual content, and (ii) which type of virtual content the user may interact with at a given point in time, wherein the probability that the user may interact with the virtual content is implemented as a binary classification problem and which type of the virtual content the user may interact is implemented as a multi-classifier problem, and wherein the output of the machine learning based artificial intelligence includes labels for classes and a confidence score or accuracy metric derived for each class.

In some embodiments, identifying the set of virtual content data comprises determining a state of the user based on objective properties and subjective properties of the user, determining a focus of the user from the state of the user and a medium in which a particular interaction between the user and an object occurs within the input data, determining a nimbus of the object from the state of the user, a state of the object, and the medium, calculating a focus region based on the focus and nimbus region based on the nimbus, and when the focus and the nimbus regions do not overlap, virtual content data associated with the object is determined to be non-relevant, when a user's position lies inside the nimbus, then virtual content data associated with the object is determined to be relevant, and when the focus and nimbus regions intersect, but the user's position lies outside the nimbus, virtual content data associated with the object is determined to be semi-relevant.

In some embodiments, determining the modifications comprises interpreting one or more rules defined based on relevancy of the virtual content data and one or more modifications associated with the relevancy.

In some embodiments, determining the modifications comprises interpreting one or more rules defined based on relevancy of the virtual content data, accuracy of the inference for the content that is of interest to the user, and one or more modifications associated with the relevancy and the accuracy.

In some embodiments, the one or more modifications scale in accordance with the accuracy of the inference for the content.

In some embodiments, the modifications comprise changing a level of contrast or transparency of the virtual content, changing a position of the virtual content, scaling size of the virtual content, adding a sound notification for the virtual content, or a combination thereof.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The techniques described above and below may be implemented in a number of ways and in a number of contexts. Several example implementations and contexts are provided with reference to the following figures, as described below in more detail. However, the following implementations and contexts are but a few of many.

DETAILED DESCRIPTION

Figure 1:
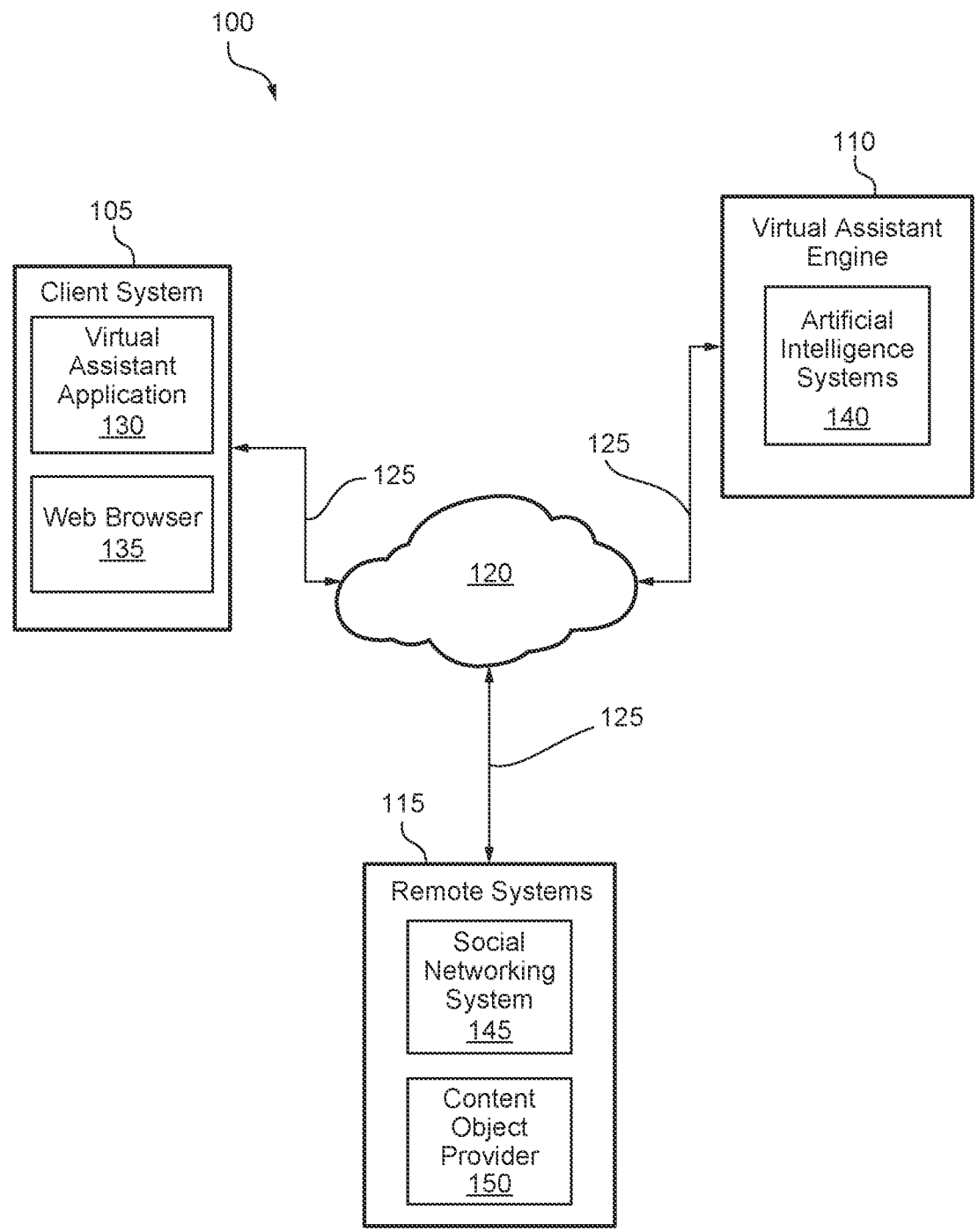
FIG. 1 is a simplified block diagram of a network environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

INTRODUCTION

Extended reality systems are becoming increasingly ubiquitous with applications in many fields such as computer gaming, health and safety, industrial, and education. As a few examples, extended reality systems are being incorporated into mobile devices, gaming consoles, personal computers, movie theaters, and theme parks. Typical extended reality systems include one or more devices for rendering and displaying content to users. As one example, an extended reality system may incorporate a HMD worn by a user and configured to output extended reality content to the user. The extended reality content may be generated in a wholly or partially simulated environment (extended reality environment) that people sense and/or interact with via an electronic system. The simulated environment may be a VR environment, which is designed to be based entirely on computer-generated sensory inputs (e.g., virtual content) for one or more user senses, or a MR environment, which is designed to incorporate sensory inputs (e.g., a view of the physical surroundings) from the physical environment, or a representation thereof, in addition to including computer-generated sensory inputs (e.g., virtual content). Examples of MR include AR and augmented virtuality (AV). An AR environment is a simulated environment in which one or more virtual objects are superimposed over a physical environment, or a representation thereof, or a simulated environment in which a representation of a physical environment is transformed by computer-generated sensory information. An AV environment refers to a simulated environment in which a virtual or computer-generated environment incorporates one or more sensory inputs from the physical environment. In any instance—VR. MR, AR, or AV, during operation, the user typically interacts with the extended reality system to interact with extended reality content.

In many activities undertaken via AR. MR, AR, or VR, users are free to roam through simulated and physical environments that contain information and objects whose visualization and/or sound may be important to a user's experience within the simulated and physical environments. For example, an extended reality system may assist a user with performance of a task in simulated and physical environments by providing them with information about their environment and instructions for performing the task. The activities undertaken via AR. MR, AR, or VR differ from conventional software applications in various ways, including the size of the simulated and physical environments that users can interact with, the importance of the physical environment and how virtual content is integrated with the physical environment, the quantity and range of virtual content that can be presented to the user and modified by the user, and the almost limitless types of interfaces that can be provided to users for interacting in the simulated and physical environments. However, the large amount of content that can be displayed combined with the presence of a complex physical world creates the potential for clutter (visual and audible) within the interfaces between the user and the simulated and physical environments. When interface components are used superfluously or when interfaces are designed without considering the right amount of content for the intended audience, the additional cognitive load can overwhelm a user with unneeded content, impacting their experience and ability to perform tasks efficiently and enjoy the extended reality experience.

In order overcome these challenges and others, techniques are disclosed herein for modifying the visualization of virtual content to the user by identifying and prioritizing the virtual content relevant to the user at a given point in time based on the attention of the user (i.e., behavior of the user). In an exemplary embodiment, a computer-implemented method is provided that includes obtaining input data from a user, where the input data includes a sequence of perceptions from a egocentric vision of the user; inferring, by rule-based artificial intelligence, machine learning based artificial intelligence, or a combination thereof, content that is of interest to the user based on features gathered from the user's attention in the input data; identifying a set of virtual content data comprising relevant virtual content data, semi-relevant virtual content data, non-relevant virtual content data, or a combination thereof based on the content that is of interest to the user; determining modifications to be applied to the relevant virtual content data, the semi-relevant virtual content data, the non-relevant virtual content data, or a combination thereof based on relevancy of the virtual content data; applying the modifications to the relevant virtual content data, the semi-relevant virtual content data, the non-relevant virtual content data, or a combination thereof in order to generate a final format for the set of virtual content; and rendering virtual content in an extended reality environment displayed to the user based on the final format for the set of virtual content. The virtual content rendered from the relevant virtual content data is more prominently displayed as compared to the virtual content rendered from the semi-relevant virtual content data and the non-relevant virtual content data.

Extended Reality System Overview

FIG. 1 illustrates an example network environment 100 associated with an extended reality system in accordance with aspects of the present disclosure. Network environment 100 includes a client system 105, a virtual assistant engine 110, and a remote systems 115 connected to each other by a network 120. Although FIG. 1 illustrates a particular arrangement of a client system 105, a virtual assistant engine 110, a remote systems 115, and a network 120, this disclosure contemplates any suitable arrangement of a client system 105, a virtual assistant engine 110, a remote systems 115, and a network 120. As an example and not by way of limitation, two or more of a client system 105, a virtual assistant engine 110, and a remote systems 115 may be connected to each other directly, bypassing the network 120. As another example, two or more of aa client system 105, a virtual assistant engine 110, and a remote systems 115 may be physically or logically co-located with each other in whole or in part. Moreover, although FIG. 1 illustrates a particular number of a client system 105, a virtual assistant engine 110, a remote systems 115, and networks 120, this disclosure contemplates any suitable number of client systems 105, virtual assistant engines 110, remote systems 115, and networks 120. As an example and not by way of limitation, network environment 100 may include multiple client systems 105, virtual assistant engines 110, remote systems 115, and networks 115.

This disclosure contemplates any suitable network 120. As an example and not by way of limitation, one or more portions of a network 120 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 120 may include one or more networks 120.

Links 125 may connect a client system 105, a virtual assistant engine 110, and a remote systems 115 to a communication network 110 or to each other. This disclosure contemplates any suitable links 125. In particular embodiments, one or more links 125 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 125 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 125, or a combination of two or more such links 125. Links 125 need not necessarily be the same throughout a network environment 100. One or more first links 125 may differ in one or more respects from one or more second links 125.

In various embodiments, a client system 105 is an electronic device including hardware, software, or embedded logic components or a combination of two or more such components and capable of carrying out the appropriate extended reality functionalities in accordance with techniques of the disclosure. As an example and not by way of limitation, a client system 105 may include a desktop computer, notebook or laptop computer, netbook, a tablet computer, e-book reader, GPS device, camera, personal digital assistant (PDA), handheld electronic device, cellular telephone, smartphone, a VR. MR, AR, or VR headset such as an AR/VR HMD, other suitable electronic device capable of displaying extended reality content, or any suitable combination thereof. In particular embodiments, the client system 105 is an AR/VR HMD as described in detail with respect to FIG. 2. This disclosure contemplates any suitable client system 105 configured to generate and output extended reality content to the user. The client system 105 may enable its user to communicate with other users at other client systems 105.

In various embodiments, the client system 105 includes a virtual assistant application 130. The virtual assistant application 130 instantiates at least a portion of the virtual assistant, which can provide information or services to a user based on user input, contextual awareness (such as clues from the physical environment or clues from user behavior), and the capability to access information from a variety of online sources (such as weather conditions, traffic information, news, stock prices, user schedules, retail prices, etc.). As used herein, when an action is "based on" something, this means the action is based at least in part on at least a part of the something. The user input may include text (e.g., online chat), especially in an instant messaging application or other applications, voice, eye-tracking, user motion such as gestures or running, or a combination of them. The virtual assistant may perform concierge-type services (e.g., making dinner reservations, purchasing event tickets, making travel arrangements, and the like), provide information (e.g., reminders, information concerning an object in an environment, information concerning a task or interaction, answers to questions, training regarding a task or activity, and the like), goal assisted services (e.g., generating and implementing a recipe to cook a meal in a certain amount of time, implementing tasks to clean in a most efficient manner, generate and execute a construction plan including allocation of tasks to two or more workers, and the like), or combinations thereof. The virtual assistant may also perform management or data-handling tasks based on online information and events without user initiation or interaction. Examples of those tasks that may be performed by a virtual assistant may include schedule management (e.g., sending an alert to a dinner date that a user is running late due to traffic conditions, update schedules for both parties, and change the restaurant reservation time). The virtual assistant may be enabled in an extended reality environment by a combination of the client system 105, the virtual assistant engine 110, application programming interfaces (APIs), and the proliferation of applications on user devices such as the remote systems 115.

A user at the client system 105 may use the virtual assistant application 130 to interact with the virtual assistant engine 110. In some instances, the virtual assistant application 130 is a stand-alone application or integrated into another application such as a social-networking application or another suitable application (e.g., an artificial simulation application). In some instances, the virtual assistant application 130 is integrated into the client system 105 (e.g., part of the operating system of the client system 105), an assistant hardware device, or any other suitable hardware devices. In some instances, the virtual assistant application 130 may be accessed via a web browser 135. In some instances, the virtual assistant application 130 passively listens to and watches interactions of the user in the real-world, and processes what it hears and sees (e.g., explicit input such as audio commands or interface commands, contextual awareness derived from audio or physical actions of the user, objects in the real-world, environmental triggers such as weather or time, and the like) in order to interact with the user in an intuitive manner.

In particular embodiments, the virtual assistant application 130 receives or obtains input from a user, the physical environment, a virtual reality environment, or a combination thereof via different modalities. As an example and not by way of limitation, the modalities may include audio, text, image, video, motion, graphical or virtual user interfaces, orientation, sensors, etc. The virtual assistant application 130 communicates the input to the virtual assistant engine 110. Based on the input, the virtual assistant engine 110 analyzes the input and generates responses (e.g., text or audio responses, device commands such as a signal to turn on a television, virtual content such as a virtual object, or the like) as output. The virtual assistant engine 110 may send the generated responses to the virtual assistant application 130, the client system 105, the remote systems 115, or a combination thereof. The virtual assistant application 130 may present the response to the user at the client system 130 (e.g., rendering virtual content overlaid on a real-world object within the display). The presented responses may be based on different modalities such as audio, text, image, and video. As an example and not by way of limitation, context concerning activity of a user in the physical world may be analyzed and determined to initiate an interaction for completing an immediate task or goal, which may include the virtual assistant application 130 retrieving traffic information (e.g., via a remote system 115). The virtual assistant application 130 may communicate the request for traffic information to virtual assistant engine 110. The virtual assistant engine 110 may accordingly contact a third party system 115 and retrieve traffic information as a result of the request and send the traffic information back to the virtual assistant application 110. The virtual assistant application 110 may then present the traffic information to the user as text (e.g., as virtual content overlaid on the physical environment such as real-world object) or audio (e.g., spoken to the user in natural language through a speaker associated with the client system 105).

In various embodiments, the virtual assistant engine 110 assists users to retrieve information from different sources, request services from different service providers, assist users to learn or complete goals and tasks using different sources and/or service providers, and combinations thereof. In some instances, the virtual assistant engine 110 receives input data from the virtual assistant application 130 and determines one or more interactions based on the input data that could be executed to request information, services, and/or complete a goal or task of the user. The interactions are actions that could be presented to a user for execution in an extended reality environment. In some instances, the interactions are influenced by other actions associated with the user. The interactions are aligned with goals or tasks associated with the user. The goals may comprise, for example, things that a user wants to occur such as a meal, a piece of furniture, a repaired automobile, a house, a garden, a clean apartment, and the like. The tasks may comprise, for example, cooking a meal using one or more recipes, building a piece of furniture, repairing a vehicle, building a house, planting a garden, cleaning one or more rooms of an apartment, and the like. Each goal and task may be associated with a workflow of actions or sub-tasks for performing the task and achieving the goal. For example for preparing a salad, the a workflow of actions or sub-tasks may comprise ingredients needed, any equipment need for the steps (e.g., a knife, a stove top, a pan, a salad spinner, etc.), sub-tasks for preparing ingredients (e.g., chopping onions, cleaning lettuce, cooking chicken, etc.), and sub-tasks for combining ingredients into subcomponents (e.g., cooking chicken with olive oil and Italian seasonings).

The virtual assistant engine 110 may use artificial intelligence systems 140 (e.g., rule based systems or machine-learning based systems such as natural-language understanding models) to analyze the input based on a user's profile and other relevant information. The result of the analysis may comprise different interactions associated with a task or goal of the user. The virtual assistant 110 may then retrieve information, request services, and/or generate instructions, recommendations, or virtual content associated with one or more of the different interactions for completing tasks or goals. In some instances, the virtual assistant engine 110 interacts with a remote system 115 such as a social-networking system 145 when retrieving information, requesting service, and/or generate instructions or recommendations for the user. The virtual assistant engine 110 may generate virtual content for the user using various techniques such as natural-language generating, virtual object rendering, and the like. The virtual content may comprise, for example, the retrieved information, the status of the requested services, a virtual object such as a glimmer overlaid on a physical object such as a appliance, light, or piece of exercise equipment, a demonstration for a task, and the like. In particular embodiments, the virtual assistant engine 110 enables the user to interact with it regarding the information, services, or goals using a graphical or virtual interface, a stateful and multi-turn conversation using dialog-management techniques, and/or a stateful and multi-action interaction using task-management techniques. The functionality of the virtual assistant engine 110 is described in more detail with respect to FIGS. 5A and 5B.

In various embodiments, a remote system 115 may include one or more types of servers, one or more data stores, one or more interfaces, including but not limited to APIs, one or more web services, one or more content sources, one or more networks, or any other suitable components, e.g., that servers may communicate with. A remote system 115 may be operated by a same entity or a different entity from an entity operating the virtual assistant engine 110. In particular embodiments, however, the virtual assistant engine 110 and third-party systems 115 may operate in conjunction with each other to provide virtual content to users of the client system 105. For example, a social-networking system 145 may provide a platform, or backbone, which other systems, such as third-party systems, may use to provide social-networking services and functionality to users across the Internet, and the virtual assistant engine 110 may access these systems to provide virtual content on the client system 105.

In particular embodiments, the social-networking system 145 may be a network-addressable computing system that can host an online social network. The social-networking system 145 may generate, store, receive, and send social-networking data, such as, for example, user-profile data, concept-profile data, social-graph information, or other suitable data related to the online social network. The social-networking system 145 may be accessed by the other components of network environment 100 either directly or via a network 120. As an example and not by way of limitation, a client system 105 may access the social-networking system 145 using a web browser 135, or a native application associated with the social-networking system 145 (e.g., a mobile social-networking application, a messaging application, another suitable application, or any combination thereof) either directly or via a network 120. The social-networking system 145 may provide users with the ability to take actions on various types of items or objects, supported by the social-networking system 145. As an example and not by way of limitation, the items and objects may include groups or social networks to which users of the social-networking system 145 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 145 or by an external system of the remote systems 115, which is separate from the social-networking system 145 and coupled to the social-networking system 115 via the network 120.

The remote system 115 may include a content object provider 150. A content object provider 150 includes one or more sources of virtual content objects, which may be communicated to the client system 105. As an example and not by way of limitation, virtual content objects may include information regarding things or activities of interest to the user, such as, for example, movie show times, movie reviews, restaurant reviews, restaurant menus, product information and reviews, instructions on how to perform various tasks, exercise regimens, cooking recipes, or other suitable information. As another example and not by way of limitation, content objects may include incentive content objects, such as coupons, discount tickets, gift certificates, or other suitable incentive objects. As another example and not by way of limitation, content objects may include virtual objects such as virtual interfaces, 2D or 3D graphics, media content, or other suitable virtual objects.

Figure 2A:
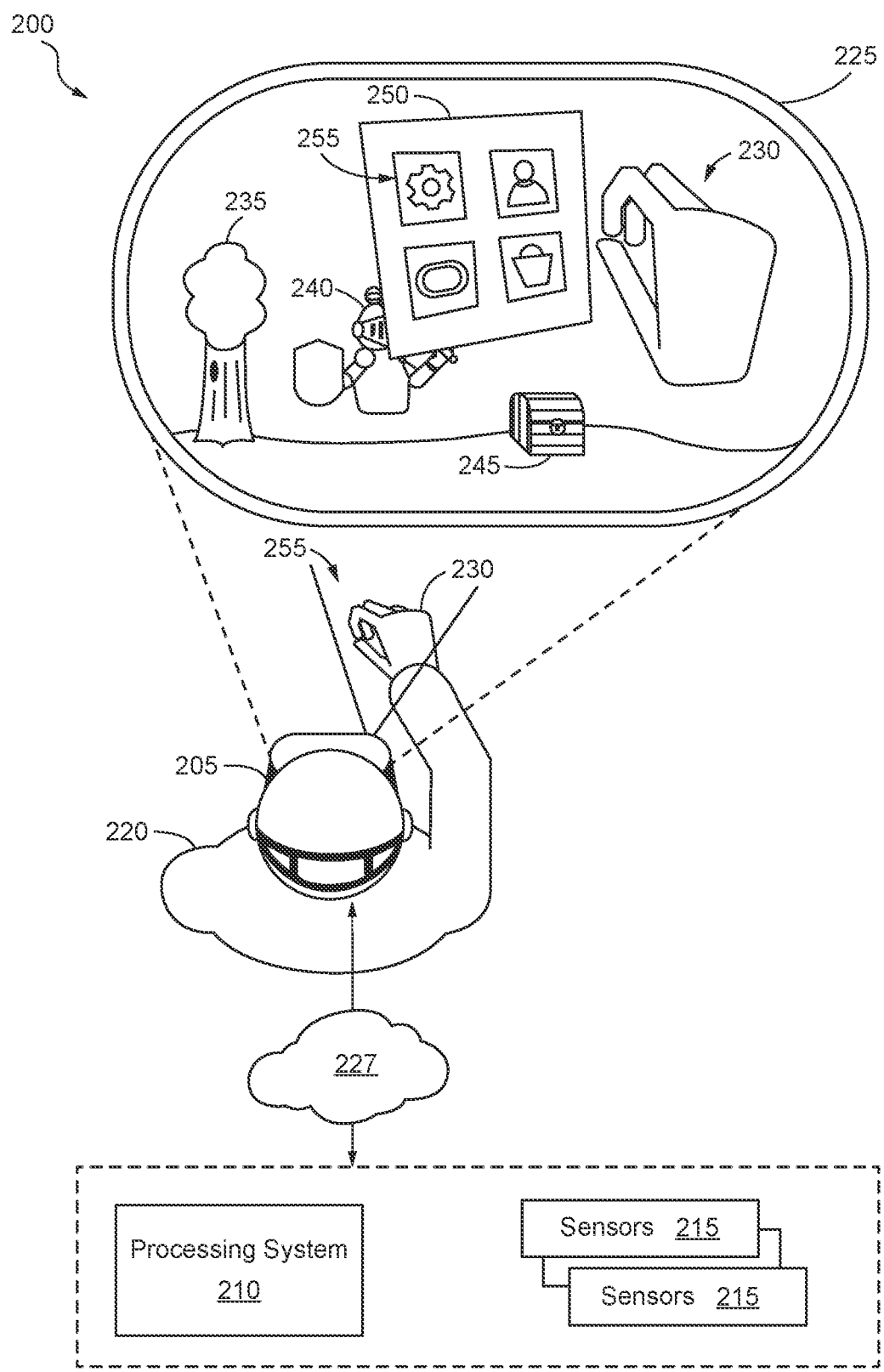
FIG. 2A an illustration depicting an example extended reality system that presents and controls user interface elements within an extended reality environment in accordance with various embodiments.

FIG. 2A illustrates an example client system 200 (e.g., client system 105 described with respect to FIG. 1) in accordance with aspects of the present disclosure. Client system 200 includes an extended reality system 205 (e.g., a HMD), a processing system 210, and one or more sensors 215. As shown, extended reality system 205 is typically worn by user 220 and comprises an electronic display (e.g., a transparent, translucent, or solid display), optional controllers, and optical assembly for presenting extended reality content 225 to the user 220. The one or more sensors 215 may include motion sensors (e.g., accelerometers) for tracking motion of the extended reality system 205 and may include one or more image capture devices (e.g., cameras, line scanners) for capturing image data of the surrounding physical environment. In this example, processing system 210 is shown as a single computing device, such as a gaming console, workstation, a desktop computer, or a laptop. In other examples, processing system 210 may be distributed across a plurality of computing devices, such as a distributed computing network, a data center, or a cloud computing system. In other examples, processing system 210 may be integrated with the HMD 205. extended reality system 205, the processing system 210, and the one or more sensors 215 are communicatively coupled via a network 227, which may be a wired or wireless network, such as Wi-Fi, a mesh network or a short-range wireless communication medium such as Bluetooth wireless technology, or a combination thereof. Although extended reality system 205 is shown in this example as in communication with, e.g., tethered to or in wireless communication with, processing system 210, in some implementations extended reality system 205 operates as a stand-alone, mobile extended reality system.

In general, client system 200 uses information captured from a real-world, physical environment to render extended reality content 225 for display to the user 220. In the example of FIG. 2, the user 220 views the extended reality content 225 constructed and rendered by an extended reality application executing on processing system 210 and/or extended reality system 205. In some examples, the extended reality content 225 viewed through the extended reality system 205 comprises a mixture of real-world imagery (e.g., the user's hand 230 and physical objects 235) and virtual imagery (e.g., virtual content such as information or objects 240, 245 and virtual user interface 250) to produce mixed reality and/or augmented reality. In some examples, virtual information or objects 240, 245 may be mapped (e.g., pinned, locked, placed) to a particular position within extended reality content 225. For example, a position for virtual information or objects 240, 245 may be fixed, as relative to one of walls of a residence or surface of the earth, for instance. A position for virtual information or objects 240, 245 may be variable, as relative to a physical object 235 or the user 220, for instance. In some examples, the particular position of virtual information or objects 240, 245 within the extended reality content 225 is associated with a position within the real world, physical environment (e.g., on a surface of a physical object 235).

In the example shown in FIG. 2A, virtual information or objects 240, 245 are mapped at a position relative to a physical object 235. As should be understood, the virtual imagery (e.g., virtual content such as information or objects 240, 245 and virtual user interface 250) does not exist in the real-world, physical environment. Virtual user interface 250 may be fixed, as relative to the user 220, the user's hand 230, physical objects 235, or other virtual content such as virtual information or objects 240, 245, for instance. As a result, client system 200 renders, at a user interface position that is locked relative to a position of the user 220, the user's hand 230, physical objects 235, or other virtual content in the extended reality environment, virtual user interface 250 for display at extended reality system 205 as part of extended reality content 225. As used herein, a virtual element 'locked' to a position of virtual content or physical object is rendered at a position relative to the position of the virtual content or physical object so as to appear to be part of or otherwise tied in the extended reality environment to the virtual content or physical object.

In some implementations, the client system 200 generates and renders virtual content (e.g., GIFs, photos, applications, live-streams, videos, text, a web-browser, drawings, animations, representations of data files, or any other visible media) on a virtual surface. A virtual surface may be associated with a planar or other real-world surface (e.g., the virtual surface corresponds to and is locked to a physical surface, such as a wall table, or ceiling). In the example shown in FIG. 2A, the virtual surface is associated with the sky and ground of the physical environment. In other examples, a virtual surface can be associated with a portion of a surface (e.g., a portion of the wall). In some examples, only the virtual content items contained within a virtual surface are rendered. In other examples, the virtual surface is generated and rendered (e.g., as a virtual plane or as a border corresponding to the virtual surface). In some examples, a virtual surface can be rendered as floating in a virtual or real-world physical environment (e.g., not associated with a particular real-world surface). The client system 200 may render one or more virtual content items in response to a determination that at least a portion of the location of virtual content items is in a field of view of the user 220. For example, client system 200 may render virtual user interface 250 only if a given physical object (e.g., a lamp) is within the field of view of the user 220.

During operation, the extended reality application constructs extended reality content 225 for display to user 220 by tracking and computing interaction information (e.g., tasks for completion) for a frame of reference, typically a viewing perspective of extended reality system 205. Using extended reality system 205 as a frame of reference, and based on a current field of view as determined by a current estimated interaction of extended reality system 205, the extended reality application renders extended reality content 225 which, in some examples, may be overlaid, at least in part, upon the real-world, physical environment of the user 220. During this process, the extended reality application uses sensed data received from extended reality system 205 and sensors 215, such as movement information, contextual awareness, and/or user commands, and, in some examples, data from any external sensors, such as third-party information or device, to capture information within the real world, physical environment, such as motion by user 220 and/or feature tracking information with respect to user 220. Based on the sensed data, the extended reality application determines interaction information to be presented for the frame of reference of extended reality system 205 and, in accordance with the current context of the user 220, renders the extended reality content 225.

Client system 205 may trigger generation and rendering of virtual content based on a current field of view of user 220, as may be determined by real-time gaze 255 tracking of the user, or other conditions. More specifically, image capture devices of the sensors 215 capture image data representative of objects in the real world, physical environment that are within a field of view of image capture devices. During operation, the client system 200 performs object recognition within image data captured by the image capture devices of extended reality system 205 to identify objects in the physical environment such as the user 220, the user's hand 230, and/or physical objects 235. Further, the client system 200 tracks the position, orientation, and configuration of the objects in the physical environment over a sliding window of time. Field of view typically corresponds with the viewing perspective of the extended reality system 205. In some examples, the extended reality application presents extended reality content 225 comprising mixed reality and/or augmented reality.

As illustrated in FIG. 2A, the extended reality application may render virtual content, such as virtual information or objects 240, 245 on a transparent display such that the virtual content is overlaid on real-world objects, such as the portions of the user 220, the user's hand 230, physical objects 235, that are within a field of view of the user 220. In other examples, the extended reality application may render images of real-world objects, such as the portions of the user 220, the user's hand 230, physical objects 235, that are within field of view along with virtual objects, such as virtual information or objects 240, 245 within extended reality content 225. In other examples, the extended reality application may render virtual representations of the portions of the user 220, the user's hand 230, physical objects 235 that are within field of view (e.g., render real-world objects as virtual objects) within extended reality content 225. In either example, user 220 is able to view the portions of the user 220, the user's hand 230, physical objects 235 and/or any other real-world objects or virtual content that are within field of view within extended reality content 225. In other examples, the extended reality application may not render representations of the user 220 and the user's hand 230; and instead only render the physical objects 235 and/or virtual information or objects 240, 245.

In various embodiments, the client system 200 renders to extended reality system 205 extended reality content 225 in which virtual user interface 250 is locked relative to a position of the user 220, the user's hand 230, physical objects 235, or other virtual content in the extended reality environment. That is, the client system 205 may render a virtual user interface 250 having one or more virtual user interface elements at a position and orientation that is based on and corresponds to the position and orientation of the user 220, the user's hand 230, physical objects 235, or other virtual content in the extended reality environment. For example, if a physical object is positioned in a vertical position on a table, the client system 205 may render the virtual user interface 250 at a location corresponding to the position and orientation of the physical object in the extended reality environment. Alternatively, if the user's hand 230 is within the field of view, the client system 200 may render the virtual user interface at a location corresponding to the position and orientation of the user's hand 230 in the extended reality environment. Alternatively, if other virtual content is within the field of view, the client system 200 may render the virtual user interface at a location corresponding to a general predetermined position of the field of view (e.g., a bottom of the field of view) in the extended reality environment. Alternatively, if other virtual content is within the field of view, the client system 200 may render the virtual user interface at a location corresponding to the position and orientation of the other virtual content in the extended reality environment. In this way, the virtual user interface 250 being rendered in the virtual environment may track the user 220, the user's hand 230, physical objects 235, or other virtual content such that the user interface appears, to the user, to be associated with the user 220, the user's hand 230, physical objects 235, or other virtual content in the extended reality environment.

Figure 2B:
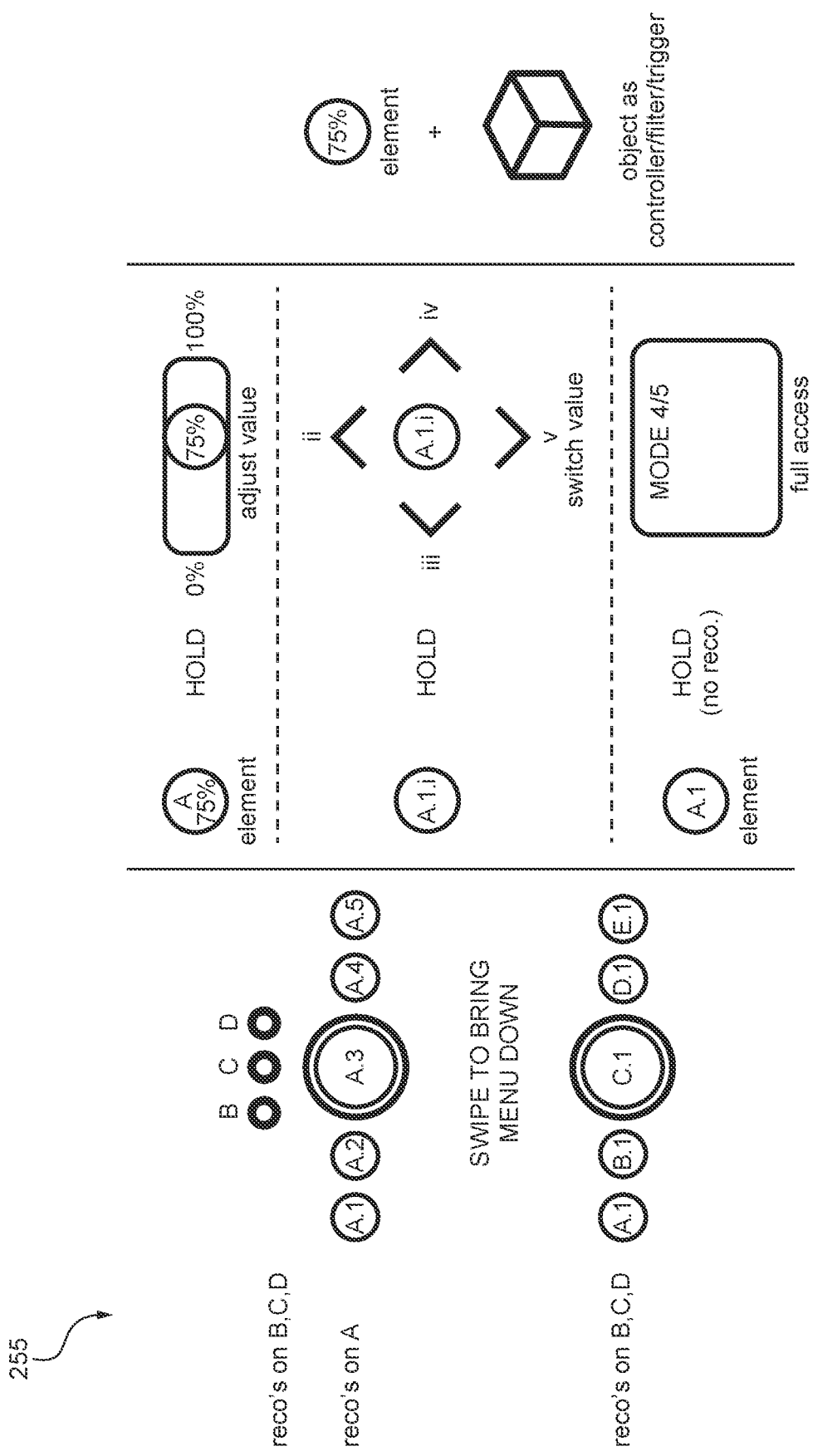
FIG. 2B an illustration depicting user interface elements in accordance with various embodiments.

As shown in FIG. 2B, virtual user interface 250 includes one or more virtual user interface elements 255. Virtual user interface elements 255 may include, for instance, a virtual drawing interface, a selectable menu (e.g., a drop-down menu), virtual buttons, a virtual slider or scroll bar, a directional pad, a keyboard, or other user-selectable user interface elements, glyphs, display elements, content, user interface controls, and so forth. The particular virtual user interface elements 255 for virtual user interface 250 may be context-driven based on the current extended reality applications engaged by the user 220 or real-world actions/tasks being performed by the user 220. When a user performs a user interface gesture in the extended reality environment at a location that corresponds to one of the virtual user interface elements 255 of virtual user interface 250, the client system 200 detects the gesture relative to the virtual user interface elements 255 and performs an action associated with the gesture and the virtual user interface elements 255. For example, the user 220 may press their finger at a button element 255 location on the virtual user interface 250. The button element 255 and/or virtual user interface 250 location may or may not be overlaid on the user 220, the user's hand 230, physical objects 235, or other virtual content, e.g., correspond to a position in the physical environment such as on a light switch or controller at which the client system 200 renders the virtual user interface button. In this example, the client system 200 detects this virtual button press gesture and performs an action corresponding to the detected press of a virtual user interface button (e.g., turns the light on). The client system 205 may also, for instance, animate a press of the virtual user interface button along with the button press gesture.

The client system 200 may detect user interface gestures and other gestures using an inside-out or outside-in tracking system of image capture devices and or external cameras. The client system 200 may alternatively, or in addition, detect user interface gestures and other gestures using a presence-sensitive surface. That is, a presence-sensitive interface of the extended reality system 205 and/or controller may receive user inputs that make up a user interface gesture. The extended reality system 205 and/or controller may provide haptic feedback to touch-based user interaction by having a physical surface with which the user can interact (e.g., touch, drag a finger across, grab, and so forth). In addition, peripheral extended reality system 205 and/or controller may output other indications of user interaction using an output device. For example, in response to a detected press of a virtual user interface button, extended reality system 205 and/or controller may output a vibration or "click" noise, or extended reality system 205 and/or controller may generate and output content to a display. In some examples, the user 220 may press and drag their finger along physical locations on the extended reality system 205 and/or controller corresponding to positions in the virtual environment at which the client system 205 renders virtual user interface elements 255 of virtual user interface 250. In this example, the client system 205 detects this gesture and performs an action according to the detected press and drag of virtual user interface elements 255, such as by moving a slider bar in the virtual environment. In this way, client system 200 simulates movement of virtual content using virtual user interface elements 255 and gestures.

Various embodiments disclosed herein may include or be implemented in conjunction with various types of extended reality systems. Extended reality content generated by the extended reality systems may include completely computer-generated content or computer-generated content combined with captured (e.g., real-world) content. The extended reality content may include video, audio, haptic feedback, or some combination thereof, any of which may be presented in a single channel or in multiple channels (such as stereo video that produces a three-dimensional (3D) effect to the viewer). Additionally, in some embodiments, extended reality may also be associated with applications, products, accessories, services, or some combination thereof, that are used to, for example, create content in an extended reality and/or are otherwise used in (e.g., to perform activities in) an extended reality.

The extended reality systems may be implemented in a variety of different form factors and configurations. Some extended reality systems may be designed to work without near-eye displays (NEDs). Other extended reality systems may include an NED that also provides visibility into the real world (such as, e.g., augmented reality system 300 in FIG. 3A) or that visually immerses a user in an extended reality (such as, e.g., virtual reality system 350 in FIG. 3B). While some extended reality devices may be self-contained systems, other extended reality devices may communicate and/or coordinate with external devices to provide an extended reality experience to a user. Examples of such external devices include handheld controllers, mobile devices, desktop computers, devices worn by a user, devices worn by one or more other users, and/or any other suitable external system.

Figure 3A:
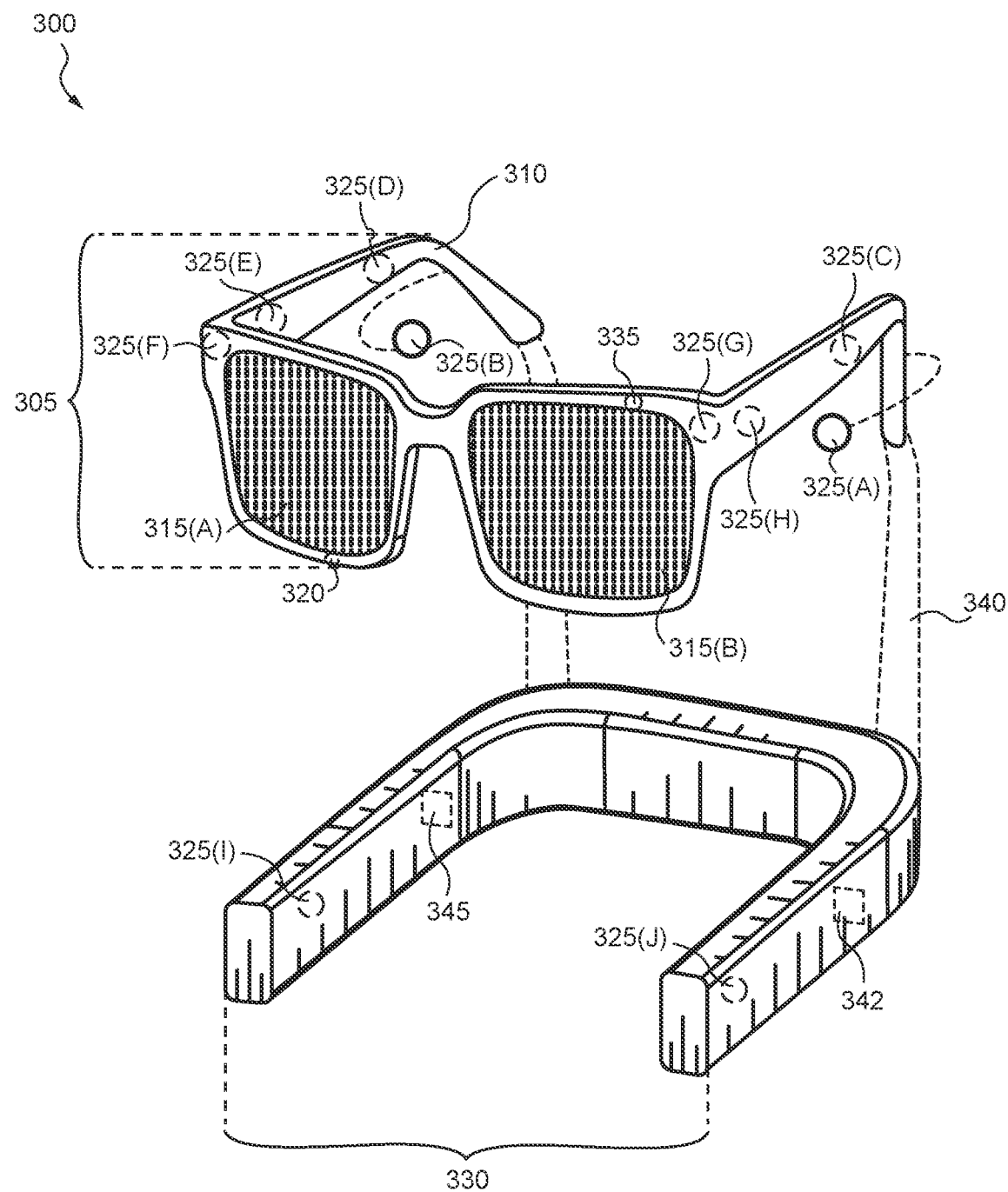
FIG. 3A is an illustration of an augmented reality system in accordance with various embodiments.

As shown in FIG. 3A, augmented reality system 300 may include an eyewear device 305 with a frame 310 configured to hold a left display device 315(A) and a right display device 315(B) in front of a user's eyes. Display devices 315(A) and 315(B) may act together or independently to present an image or series of images to a user. While augmented reality system 300 includes two displays, embodiments of this disclosure may be implemented in augmented reality systems with a single NED or more than two NEDs.

In some embodiments, augmented reality system 300 may include one or more sensors, such as sensor 320. Sensor 320 may generate measurement signals in response to motion of augmented reality system 300 and may be located on substantially any portion of frame 310. Sensor 320 may represent one or more of a variety of different sensing mechanisms, such as a position sensor, an inertial measurement unit (IMU), a depth camera assembly, a structured light emitter and/or detector, or any combination thereof. In some embodiments, augmented reality system 300 may or may not include sensor 320 or may include more than one sensor. In embodiments in which sensor 320 includes an IMU, the IMU may generate calibration data based on measurement signals from sensor 320. Examples of sensor 320 may include, without limitation, accelerometers, gyroscopes, magnetometers, other suitable types of sensors that detect motion, sensors used for error correction of the IMU, or some combination thereof.

In some examples, augmented reality system 300 may also include a microphone array with a plurality of acoustic transducers 325(A)-325(J), referred to collectively as acoustic transducers 325. Acoustic transducers 325 may represent transducers that detect air pressure variations induced by sound waves. Each acoustic transducer 325 may be configured to detect sound and convert the detected sound into an electronic format (e.g., an analog or digital format). The microphone array in FIG. 3A may include, for example, ten acoustic transducers: 325(A) and 325(B), which may be designed to be placed inside a corresponding ear of the user, acoustic transducers 325(C), 325(D), 325(E), 325(F), 325 (G), and 325(H), which may be positioned at various locations on frame 310, and/or acoustic transducers 325(I) and 325(J), which may be positioned on a corresponding neckband 330.

In some embodiments, one or more of acoustic transducers 325(A)-(J) may be used as output transducers (e.g., speakers). For example, acoustic transducers 325(A) and/or 325(B) may be earbuds or any other suitable type of headphone or speaker. The configuration of acoustic transducers 325 of the microphone array may vary. While augmented reality system 300 is shown in FIG. 3 as having ten acoustic transducers 325, the number of acoustic transducers 325 may be greater or less than ten. In some embodiments, using higher numbers of acoustic transducers 325 may increase the amount of audio information collected and/or the sensitivity and accuracy of the audio information. In contrast, using a lower number of acoustic transducers 325 may decrease the computing power required by an associated controller 335 to process the collected audio information. In addition, the position of each acoustic transducer 325 of the microphone array may vary. For example, the position of an acoustic transducer 325 may include a defined position on the user, a defined coordinate on frame 310, an orientation associated with each acoustic transducer 325, or some combination thereof.

Acoustic transducers 325(A) and 325(B) may be positioned on different parts of the user's ear, such as behind the pinna, behind the tragus, and/or within the auricle or fossa. Or, there may be additional acoustic transducers 325 on or surrounding the ear in addition to acoustic transducers 325 inside the ear canal. Having an acoustic transducer 325 positioned next to an ear canal of a user may enable the microphone array to collect information on how sounds arrive at the ear canal. By positioning at least two of acoustic transducers 325 on either side of a user's head (e.g., as binaural microphones), augmented reality device 300 may simulate binaural hearing and capture a 3D stereo sound field around about a user's head. In some embodiments, acoustic transducers 325(A) and 325(B) may be connected to augmented reality system 300 via a wired connection 340, and in other embodiments acoustic transducers 325(A) and 325(B) may be connected to augmented reality system 300 via a wireless connection (e.g., a Bluetooth connection). In still other embodiments, acoustic transducers 325(A) and 325(B) may not be used at all in conjunction with augmented reality system 300.

Acoustic transducers 325 on frame 310 may be positioned in a variety of different ways, including along the length of the temples, across the bridge, above or below display devices 315(A) and 315(B), or some combination thereof. Acoustic transducers 325 may also be oriented such that the microphone array is able to detect sounds in a wide range of directions surrounding the user wearing the augmented reality system 300. In some embodiments, an optimization process may be performed during manufacturing of augmented reality system 300 to determine relative positioning of each acoustic transducer 325 in the microphone array.

In some examples, augmented reality system 300 may include or be connected to an external device (e.g., a paired device), such as neckband 330. Neckband 330 generally represents any type or form of paired device. Thus, the following discussion of neckband 330 may also apply to various other paired devices, such as charging cases, smart watches, smart phones, wrist bands, other wearable devices, hand-held controllers, tablet computers, laptop computers, other external compute devices, etc.

As shown, neckband 330 may be coupled to eyewear device 305 via one or more connectors. The connectors may be wired or wireless and may include electrical and/or non-electrical (e.g., structural) components. In some cases, eyewear device 305 and neckband 330 may operate independently without any wired or wireless connection between them. While FIG. 3A illustrates the components of eyewear device 305 and neckband 330 in example locations on eyewear device 305 and neckband 330, the components may be located elsewhere and/or distributed differently on eyewear device 305 and/or neckband 330. In some embodiments, the components of eyewear device 305 and neckband 330 may be located on one or more additional peripheral devices paired with eyewear device 305, neckband 330, or some combination thereof.

Pairing external devices, such as neckband 330, with augmented reality eyewear devices may enable the eyewear devices to achieve the form factor of a pair of glasses while still providing sufficient battery and computation power for expanded capabilities. Some or all of the battery power, computational resources, and/or additional features of augmented reality system 300 may be provided by a paired device or shared between a paired device and an eyewear device, thus reducing the weight, heat profile, and form factor of the eyewear device overall while still retaining desired functionality. For example, neckband 330 may allow components that would otherwise be included on an eyewear device to be included in neckband 330 since users may tolerate a heavier weight load on their shoulders than they would tolerate on their heads. Neckband 330 may also have a larger surface area over which to diffuse and disperse heat to the ambient environment. Thus, neckband 330 may allow for greater battery and computation capacity than might otherwise have been possible on a stand-alone eyewear device. Since weight carried in neckband 330 may be less invasive to a user than weight carried in eyewear device 305, a user may tolerate wearing a lighter eyewear device and carrying or wearing the paired device for greater lengths of time than a user would tolerate wearing a heavy standalone eyewear device, thereby enabling users to more fully incorporate extended reality environments into their day-to-day activities.

Neckband 330 may be communicatively coupled with eyewear device 305 and/or to other devices. These other devices may provide certain functions (e.g., tracking, localizing, depth mapping, processing, storage, etc.) to augmented reality system 300. In the embodiment of FIG. 3A, neckband 330 may include two acoustic transducers (e.g., 325(I) and 325(J)) that are part of the microphone array (or potentially form their own microphone subarray). Neckband 330 may also include a controller 342 and a power source 345.

Acoustic transducers 325(I) and 325(J) of neckband 330 may be configured to detect sound and convert the detected sound into an electronic format (analog or digital). In the embodiment of FIG. 3A, acoustic transducers 325(I) and 325(J) may be positioned on neckband 330, thereby increasing the distance between the neckband acoustic transducers 325(I) and 325(J) and other acoustic transducers 325 positioned on eyewear device 305. In some cases, increasing the distance between acoustic transducers 325 of the microphone array may improve the accuracy of beamforming performed via the microphone array. For example, if a sound is detected by acoustic transducers 325(C) and 325(D) and the distance between acoustic transducers 325(C) and 325(D) is greater than, e.g., the distance between acoustic transducers 325(D) and 325(E), the determined source location of the detected sound may be more accurate than if the sound had been detected by acoustic transducers 325(D) and 325(E).

Controller 342 of neckband 330 may process information generated by the sensors on neckband 330 and/or augmented reality system 300. For example, controller 342 may process information from the microphone array that describes sounds detected by the microphone array. For each detected sound, controller 342 may perform a direction-of-arrival (DOA) estimation to estimate a direction from which the detected sound arrived at the microphone array. As the microphone array detects sounds, controller 342 may populate an audio data set with the information. In embodiments in which augmented reality system 300 includes an inertial measurement unit, controller 342 may compute all inertial and spatial calculations from the IMU located on eyewear device 305. A connector may convey information between augmented reality system 300 and neckband 330 and between augmented reality system 300 and controller 342. The information may be in the form of optical data, electrical data, wireless data, or any other transmittable data form. Moving the processing of information generated by augmented reality system 300 to neckband 330 may reduce weight and heat in eyewear device 305, making it more comfortable to the user.

Power source 345 in neckband 330 may provide power to eyewear device 305 and/or to neckband 330. Power source 345 may include, without limitation, lithium ion batteries, lithium-polymer batteries, primary lithium batteries, alkaline batteries, or any other form of power storage. In some cases, power source 345 may be a wired power source. Including power source 345 on neckband 330 instead of on eyewear device 305 may help better distribute the weight and heat generated by power source 345.

As noted, some extended reality systems may, instead of blending an extended reality with actual reality, substantially replace one or more of a user's sensory perceptions of the real world with a virtual experience. One example of this type of system is a head-worn display system, such as virtual reality system 350 in FIG. 3B, that mostly or completely covers a user's field of view. Virtual reality system 350 may include a front rigid body 355 and a band 360 shaped to fit around a user's head. Virtual reality system 1700 may also include output audio transducers 365(A) and 365(B). Furthermore, while not shown in FIG. 3B, front rigid body 355 may include one or more electronic elements, including one or more electronic displays, one or more inertial measurement units (IMUs), one or more tracking emitters or detectors, and/or any other suitable device or system for creating an extended reality experience.

Extended reality systems may include a variety of types of visual feedback mechanisms. For example, display devices in augmented reality system 300 and/or virtual reality system 350 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These extended reality systems may include a single display screen for both eyes or may provide a display screen for each eye, which may allow for additional flexibility for varifocal adjustments or for correcting a user's refractive error. Some of these extended reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the extended reality systems described herein may include one or more projection systems. For example, display devices in augmented reality system 300 and/or virtual reality system 350 may include micro-LED projectors that project light (using, e.g., a waveguide) into display devices, such as clear combiner lenses that allow ambient light to pass through. The display devices may refract the projected light toward a user's pupil and may enable a user to simultaneously view both extended reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Extended reality systems may also be configured with any other suitable type or form of image projection system, such as retinal projectors used in virtual retina displays.

The extended reality systems described herein may also include various types of computer vision components and subsystems. For example, augmented reality system 300 and/or virtual reality system 350 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An extended reality system may process data from one or more of these sensors to identify a location of a user, to map the real world, to provide a user with context about real-world surroundings, and/or to perform a variety of other functions.

The extended reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the extended reality systems described herein may also include tactile (e.g., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other extended reality devices, within other extended reality devices, and/or in conjunction with other extended reality devices.

By providing haptic sensations, audible content, and/or visual content, extended reality systems may create an entire virtual experience or enhance a user's real-world experience in a variety of contexts and environments. For instance, extended reality systems may assist or extend a user's perception, memory, or cognition within a particular environment. Some systems may enhance a user's interactions with other people in the real world or may enable more immersive interactions with other people in a virtual world. Extended reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's extended reality experience in one or more of these contexts and environments and/or in other contexts and environments.

As noted, extended reality systems 300 and 350 may be used with a variety of other types of devices to provide a more compelling extended reality experience. These devices may be haptic interfaces with transducers that provide haptic feedback and/or that collect haptic information about a user's interaction with an environment. The extended reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 4A:
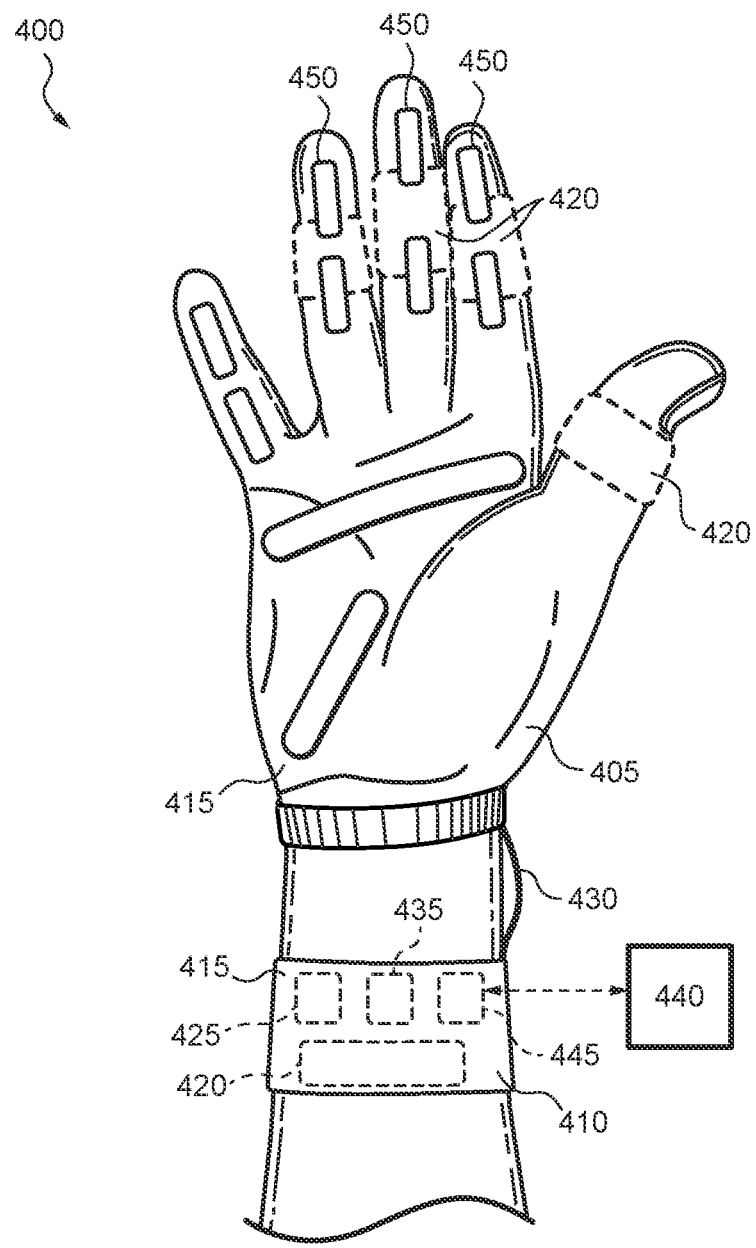
FIG. 4A is an illustration of haptic devices in accordance with various embodiments.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 4A illustrates a vibrotactile system 400 in the form of a wearable glove (haptic device 405) and wristband (haptic device 410). Haptic device 405 and haptic device 410 are shown as examples of wearable devices that include a flexible, wearable textile material 415 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 420 may be positioned at least partially within one or more corresponding pockets formed in textile material 415 of vibrotactile system 400. Vibrotactile devices 420 may be positioned in locations to provide a vibrating sensation (e.g., haptic feedback) to a user of vibrotactile system 400. For example, vibrotactile devices 420 may be positioned against the user's finger(s), thumb, or wrist, as shown in FIG. 4A. Vibrotactile devices 420 may, in some examples, be sufficiently flexible to conform to or bend with the user's corresponding body part(s).

A power source 425 (e.g., a battery) for applying a voltage to the vibrotactile devices 420 for activation thereof may be electrically coupled to vibrotactile devices 420, such as via conductive wiring 430. In some examples, each of vibrotactile devices 420 may be independently electrically coupled to power source 425 for individual activation. In some embodiments, a processor 435 may be operatively coupled to power source 425 and configured (e.g., programmed) to control activation of vibrotactile devices 420.

Vibrotactile system 400 may be implemented in a variety of ways. In some examples, vibrotactile system 400 may be a standalone system with integral subsystems and components for operation independent of other devices and systems. As another example, vibrotactile system 400 may be configured for interaction with another device or system 440. For example, vibrotactile system 400 may, in some examples, include a communications interface 445 for receiving and/or sending signals to the other device or system 440. The other device or system 440 may be a mobile device, a gaming console, an extended reality (e.g., virtual reality, augmented reality, mixed-reality) device, a personal computer, a tablet computer, a network device (e.g., a modem, a router, etc.), a handheld controller, etc. Communications interface 445 may enable communications between vibrotactile system 400 and the other device or system 440 via a wireless (e.g., Wi-Fi, Bluetooth, cellular, radio, etc.) link or a wired link. If present, communications interface 445 may be in communication with processor 435, such as to provide a signal to processor 435 to activate or deactivate one or more of the vibrotactile devices 420.

Vibrotactile system 400 may optionally include other subsystems and components, such as touch-sensitive pads 450, pressure sensors, motion sensors, position sensors, lighting elements, and/or user interface elements (e.g., an on/off button, a vibration control element, etc.). During use, vibrotactile devices 420 may be configured to be activated for a variety of different reasons, such as in response to the user's interaction with user interface elements, a signal from the motion or position sensors, a signal from the touch-sensitive pads 450, a signal from the pressure sensors, a signal from the other device or system 440, etc.

Although power source 425, processor 435, and communications interface 445 are illustrated in FIG. 4A as being positioned in haptic device 410, the present disclosure is not so limited. For example, one or more of power source 425, processor 435, or communications interface 445 may be positioned within haptic device 405 or within another wearable textile.

Figure 4B:
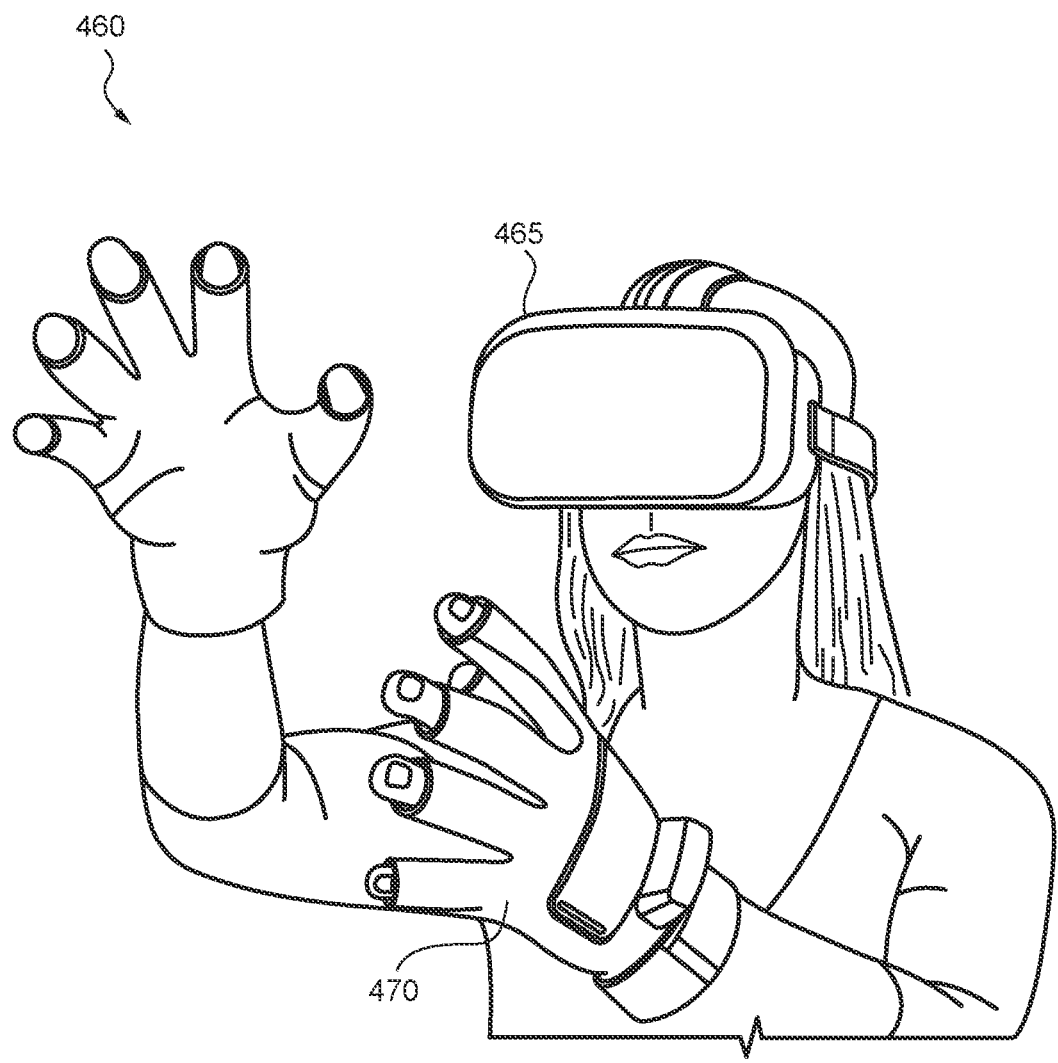
FIG. 4B is an illustration of an exemplary virtual reality environment in accordance with various embodiments.

Haptic wearables, such as those shown in and described in connection with FIG. 4A, may be implemented in a variety of types of extended reality systems and environments. FIG. 4B shows an example extended reality environment 460 including one head-mounted virtual reality display and two haptic devices (e.g., gloves), and in other embodiments any number and/or combination of these components and other components may be included in an extended reality system. For example, in some embodiments there may be multiple head-mounted displays each having an associated haptic device, with each head-mounted display and each haptic device communicating with the same console, portable computing device, or other computing system.

Figure 3B:
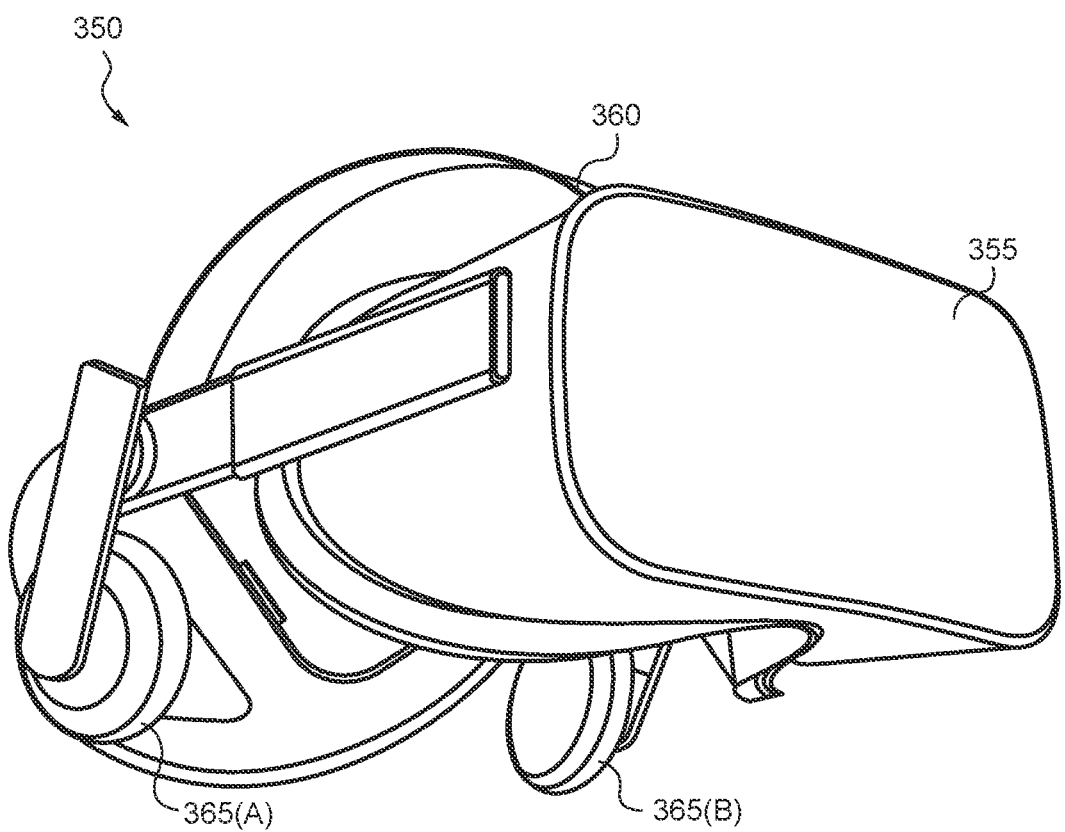
FIG. 3B is an illustration of a virtual reality system in accordance with various embodiments.

HMD 465 generally represents any type or form of virtual reality system, such as virtual reality system 350 in FIG. 3B. Haptic device 470 generally represents any type or form of wearable device, worn by a user of an extended reality system, that provides haptic feedback to the user to give the user the perception that he or she is physically engaging with a virtual object. In some embodiments, haptic device 470 may provide haptic feedback by applying vibration, motion, and/or force to the user. For example, haptic device 470 may limit or augment a user's movement. To give a specific example, haptic device 470 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 470 to send action requests to a console. Examples of action requests include, without limitation, requests to start an application and/or end the application and/or requests to perform a particular action within the application.

Figure 4C:
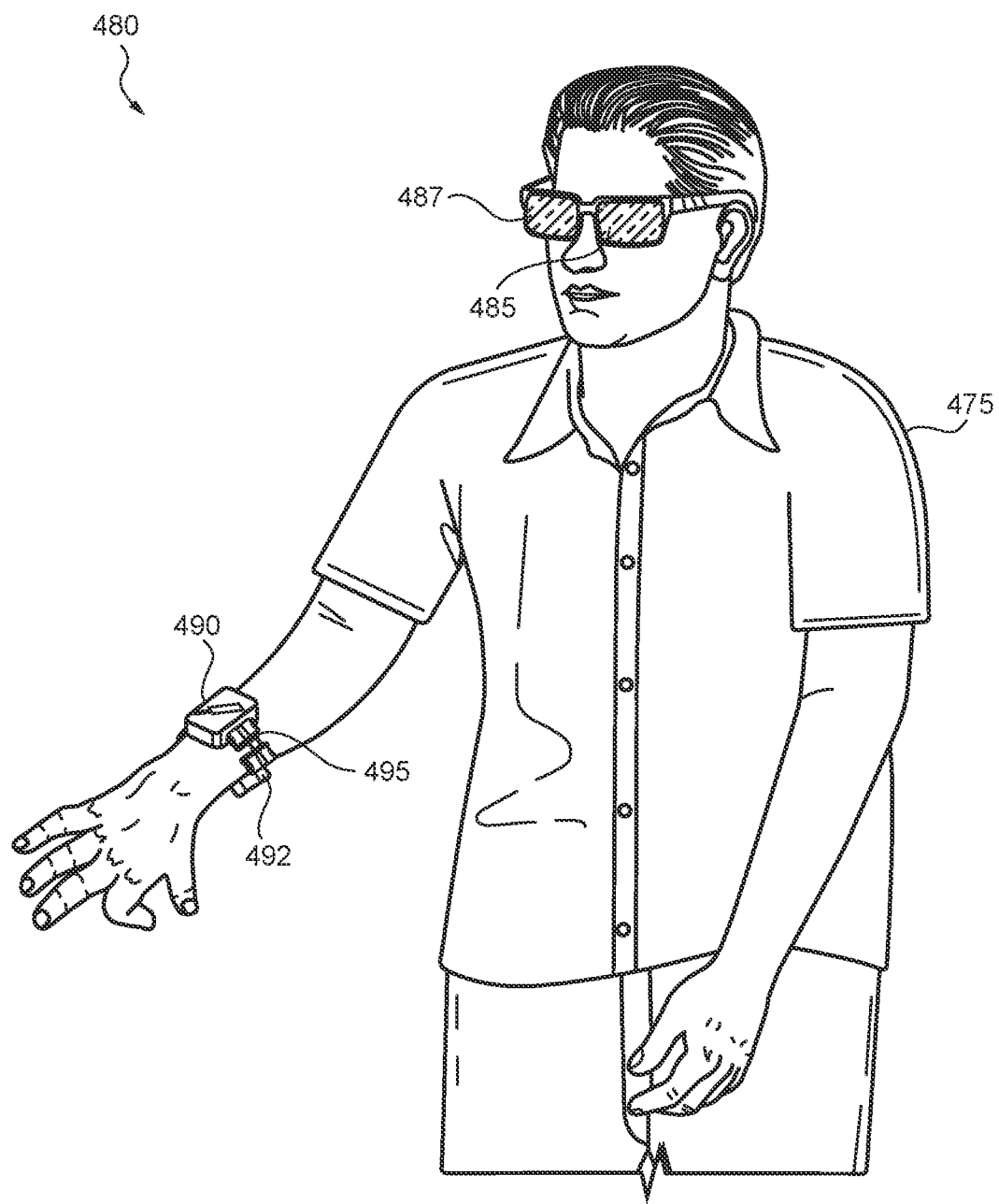
FIG. 4C is an illustration of an exemplary augmented reality environment in accordance with various embodiments.

While haptic interfaces may be used with virtual reality systems, as shown in FIG. 4B, haptic interfaces may also be used with augmented reality systems, as shown in FIG. 4C. FIG. 4C is a perspective view of a user 475 interacting with an augmented reality system 480. In this example, user 475 may wear a pair of augmented reality glasses 485 that may have one or more displays 487 and that are paired with a haptic device 490. In this example, haptic device 490 may be a wristband that includes a plurality of band elements 492 and a tensioning mechanism 495 that connects band elements 492 to one another.

One or more of band elements 492 may include any type or form of actuator suitable for providing haptic feedback. For example, one or more of band elements 492 may be configured to provide one or more of various types of cutaneous feedback, including vibration, force, traction, texture, and/or temperature. To provide such feedback, band elements 492 may include one or more of various types of actuators. In one example, each of band elements 492 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 405, 410, 470, and 490 may include any suitable number and/or type of haptic transducer, sensor, and/or feedback mechanism. For example, haptic devices 405, 410, 470, and 490 may include one or more mechanical transducers, piezoelectric transducers, and/or fluidic transducers. Haptic devices 405, 410, 470, and 490 may also include various combinations of different types and forms of transducers that work together or independently to enhance a user's extended reality experience. In one example, each of band elements 492 of haptic device 490 may include a vibrotactor (e.g., a vibrotactile actuator) configured to vibrate in unison or independently to provide one or more of various types of haptic sensations to a user.

Figure 5:
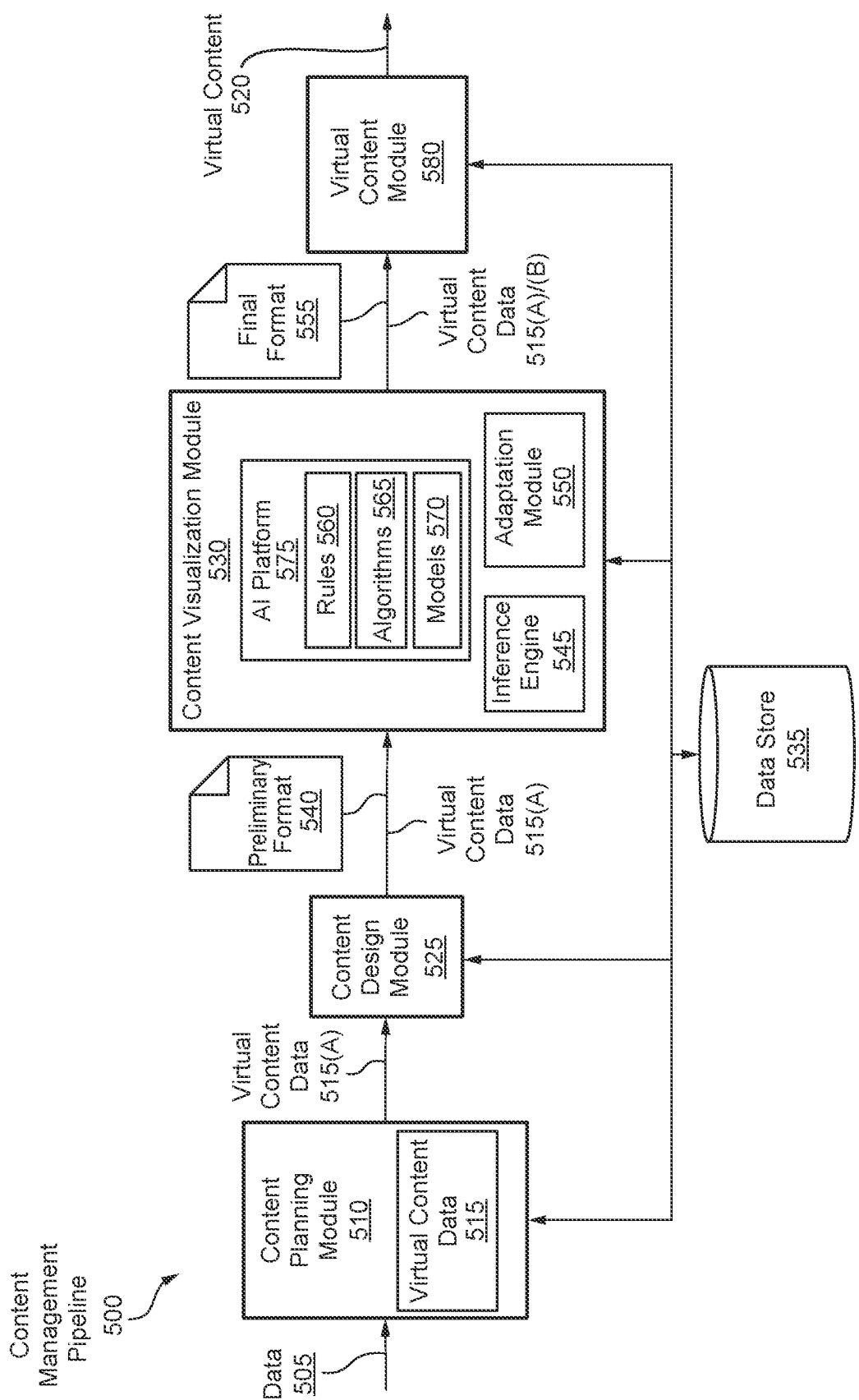
FIG. 5 is a simplified block diagram of a content management pipeline in accordance with various embodiments.

FIG. 5 is a simplified block diagram of a content management pipeline 500 for implementing various content management techniques. As described herein simulated and physical environments have the potential to overwhelm a user with unneeded content (i.e., clutter), impacting their experience and ability to perform tasks efficiently and enjoy the extended reality experience. In order to address clutter, the content management pipeline 500 takes as input, data 505, and applies to the data 505 content management techniques including content planning, content design, and content visualization in order to reduce clutter and improve task efficiency and the user's experience. The content planning module 510 analyzes the data 505 to identify virtual content data 515 to be used for rendering virtual content 520 in an extended reality environment displayed to a user. The content design module 525 determines the format in which the virtual content data 515 is to be communicated to the user (e.g., positioning, scaling, and orientation) based on various factor including contextual information such as available display resources and position-tracking accuracy (e.g., head position tracking and point of view). The content visualization module 530 integrates the formatted virtual content data 515 with the extended reality environment to ensure that the rendered virtual content 520 is arranged and visualized appropriately for consumption by the user.

The data 505 is obtained from input associated with the user. More specifically, the content management pipeline 500 obtains the data 505 in a passive or active manner as the user utilizes the client system, e.g., wears the HMD while performing an activity. The data 505 is obtained using one or more I/O interfaces, which allow for communicating with external devices, such as a keyboard, game controllers, display devices, image capture devices, HMDs, and the like. Moreover, the one or more I/O interfaces may include one or more wired or wireless NICs for communicating with a network, such as network 120 described with respect to FIG. 1. A passive manner means that the content management pipeline 500 obtains data via the image capture devices, sensors, remote systems, the like, or combinations thereof without prompting the user with virtual content, e.g., text, audio, glimmers, etc. An active manner means that the content management pipeline 500 obtains data via the image capture devices, sensors, remote systems, the like, or combinations thereof by prompting the user with virtual content, e.g., text, audio, glimmers, etc. The data 505 includes: (i) data regarding activity of the user in a physical environment, a virtual environment, or a combination thereof (e.g., an extended reality environment comprising images and audio of the user interacting in the physical environment and/or the virtual environment), (ii) data from external systems, or (iii) both.

In some embodiments, the data 505 associated with sensors, active information, and/or passive information collected via the client system may be associated with one or more privacy settings. The data 505 may be stored on or otherwise associated with any suitable computing system or application, such as, for example, the social-networking system, the client system, a third-party system, a messaging application, a photo-sharing application, a biometric data acquisition application, an artificial-reality application, a virtual assistant application, and/or any other suitable computing system or application.

Privacy settings (or "access settings") for the data 505 may be stored in any suitable manner; such as, for example, in association with data 505, in an index on an authorization server, in another suitable manner, or any suitable combination thereof. A privacy setting for data 505 may specify how the data 505 (or particular information associated with the data 505) can be accessed, stored, or otherwise used (e.g., viewed, shared, modified, copied, executed, surfaced, or identified) within an application (such as an artificial-reality application). When privacy settings for the data 505 allow a particular user or other entity to access that the data 505, the data 505 may be described as being "visible" with respect to that user or other entity. As an example, a user of an extended reality application or virtual assistant application 505 may specify privacy settings for a user profile page that identify a set of users that may access the extended reality application extended reality application or virtual assistant application 505 information on the user profile page, thus excluding other users from accessing that information. As another example, an extended reality application extended reality application or virtual assistant application may store privacy policies/guidelines. The privacy policies/guidelines may specify what information of users may be accessible by which entities and/or by which processes (e.g., internal research, advertising algorithms, machine-learning algorithms), thus ensuring only certain information of the user may be accessed by certain entities or processes.

In some embodiments, privacy settings for the data 505 may specify a "blocked list" of users or other entities that should not be allowed to access certain information associated with the data 505. In some cases, the blocked list may include third-party entities. The blocked list may specify one or more users or entities for which the data 505 is not visible.

Privacy settings associated with the data 505 may specify any suitable granularity of permitted access or denial of access. As an example, access or denial of access may be specified for particular users (e.g., only me, my roommates, my boss), users within a particular degree-of-separation (e.g., friends, friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable entities, or any suitable combination thereof. In some embodiments, different pieces of the data 505 of the same type associated with a user may have different privacy settings. In addition, one or more default privacy settings may be set for each piece of data 505 of a particular data-type.

The data 505 may be processed by the content management pipeline 500 in a single occurrence, e.g., a single interface input or single activity, or across multiple occurrences, e.g., a dialog or days' worth of activity using various techniques (e.g., manual, batch, real-time or streaming, artificial intelligence, distributed, integrated, normalization, standardization, data mining, statistical, or like processing techniques) depending on how the data 505 is obtained and the type of data 505 to be processed. In certain instances, the data 505 comprises a sequence of perceptions $(x_1, \ldots, x_T)$ received for a given time step and processed from the egocentric vision or first-person vision of the user. Egocentric vision entails processing images and videos captured by a wearable camera, which is typically worn on the head or on the chest and naturally approximates the visual field of the camera wearer. The sequence of perceptions $(x_1, \ldots, x_T)$ may correspond to a few frames of input data received from the client system such as a HMD for a given time step. A data frame is a data structure for storing data in a data store 535. The data frame includes a list of equal-length vectors. Each element of the list may be interpreted as a column and the length of each element of the list is the number of rows. As a result, data frames can store different classes of objects in each column (e.g., numeric, character, factor, etc.). The data store 535 is one or more repositories for persistently storing and managing collections of data such as databases, files, key-value stores, search engines, message queues, the like, and combinations thereof.

The content planning module 510 determines virtual content data 515 corresponding to various patterns, objects, locations, or other features within the data 505. The determining includes application of various detection techniques such as marker based content detection, markerless based content detection, and location based content detection. In marker-based content detection, the content planning module 510 uses object detection (using rule-based artificial intelligence and/or machine learning based artificial intelligence) to identify objects that have been preprogrammed into the client system or extended reality application. When the object detection detects a marker (often something simple but distinct, like a QR code), the client system or extended reality application compares the information from the marker with the markers in a data store 535 to identify virtual content data 515 associated with the marker. In markerless based content detection, the content planning module 510 uses image or pattern recognition (using rule-based artificial intelligence and/or machine learning based artificial intelligence) to identify various patterns, objects, or other features that have been learned by the client system or extended reality application. When the image or pattern recognition detects a pattern, object, or other feature (e.g., a person, a vehicle, a retail product, etc.), the client system or extended reality application compares the pattern, object, or other feature with the patterns, objects, or other features in a data store 535 to identify virtual content data 515 associated with the pattern, object, or other feature. In location based content detection, the content planning module 510 uses GPS, compass, and/or computer vision techniques (e.g., image classification, object detection, object tracking, semantic segmentation, instance segmentation, and the like) to identify a specific location (e.g., a street or building, or a location in a room or on a shelf) that has been preprogrammed or learned by the client system or extended reality application. When the GPS, compass, and/or computer vision detects a specific location, the client system or extended reality application compares the specific location with locations in a data store 535 to identify virtual content data 515 associated with the specific location.

The content planning module 510 filters the virtual content data 515 determined from the data 505 to obtain a subset of virtual content data 515 that could possibly be used to generate virtual content 520 for display to the user. The filtering process identifies a subset of virtual content data based on what is determined to be visible, perceivable, interactable, or a combination thereof to the user. The determination may be based on the user's location, tasks, goals, and physical context or environment. The filtering is performed using one or more various filtering techniques including distance-based, visibility-based, spatial-based, objective-based, subjective-based, and any combination thereof. The distance-based filters an objects visibility based on its calculated distance from the user and a distance threshold. If the distance exceeds the threshold, the virtual content data 515 for the object may be determined not to be relevant the user and is thus not included in the subset of virtual content data 515(A). If the distance does not exceed the threshold, the virtual content data 515 for the object may be determined to be relevant the user and is thus included in the subset of virtual content data 515(A). The visibility-based filters determine whether an object is visible to a user based on computer vision techniques. If the object is not visible, the virtual content data 515 for the object may be determined not to be relevant the user and is thus not included in the subset of virtual content data 515(A). If the object is visible, the virtual content data 515 for the object may be determined to be relevant the user and is thus included in the subset of virtual content data 515(A).

The spatial-based filter uses a spatial model of interaction to consider awareness and interaction, where awareness can be used to determine whether or not an object is visible to, or capable of interaction with, another object. In this filter, each object (e.g., a user, a physical object, a virtual object, etc.) is surrounded by a focus, specific to the medium (e.g., graphics, sound, text, etc.), which defines the part of the environment of which the object is aware in that medium. Each object in the environment also has a medium-specific nimbus, which demarcates the space within which other objects can be aware of that object. If the foci and nimbi intersect, the objects are capable of perceiving one another and can interact with one another. If an object is not perceivable or cannot be interacted with by the user, the virtual content data 515 for the object may be determined not to be relevant the user and is thus not included in the subset of virtual content data 515(A). If an object is perceivable or can be interacted with by the user, the virtual content data 515 for the object may be determined to be relevant the user and is thus included in the subset of virtual content data 515(A).

The objective-based filter use objective properties as a means for considering awareness and interaction (e.g., via a model of interaction). The objective properties are the same for all users, irrespective of the tasks which that user is carrying out. Such properties include the object's classification (for example whether an object is a car or bicycle), the object's location, the object's size and the object's shape. This can be extended by noting that many types of objects have an impact zone, which is an extended region over which an object has a direct physical impact. A wireless networking system such as the LAN, for example, is effective over a finite distance. This region can be represented as a sphere whose radius equals the maximum reliable transmission range. Conversely, a more accurate representation could take account of the masking and multi-path effects of buildings and terrain through modeling the impact zone as a series of interconnected volumes. Because of their differing physical properties, different media (sounds, graphics, text, etc.) can have different impact zones. Each user has their own objective properties (such as position and orientation), which can be used to model the state of the user. The state of the user, the state of objects, and the medium within which the user-object interaction occurs can then be used to determine the focus and nimbus as discussed with respect to the spatial model of interaction. If the foci and nimbi intersect, the objects are capable of perceiving one another and can interact with one another. If an object is not perceivable or cannot be interacted with by the user, the virtual content data 515 for the object may be determined not to be relevant the user and is thus not included in the subset of virtual content data 515(A). If an object is perceivable or can be interacted with by the user, the virtual content data 515 for the object may be determined to be relevant the user and is thus included in the subset of virtual content data 515(A).

The subjective-based filter use subjective properties as a means for considering awareness and interaction (e.g., via a model of interaction). The subjective properties attempt to encapsulate the domain-specific knowledge of how a particular object relates to a particular task for a particular user. Therefore, the subjective properties vary between users and depend on the user's task and context. This data can be modeled using a subjective vector. The subjective vector stores the relevance of an object with respect to a set of domain-specific and user scenario specific criteria. For example, if a user is following a route to a particular location, only that location and route information which leads to it is relevant for display—all other information may be considered less important. In general, the relevance is not binary-valued, but is a continuum that is normalized to the range from 0 (irrelevant) to 1 (highly relevant). For example, for the route information criterion, the relevance might indicate the information's usefulness for navigating to the location (e.g., construction on the planned route would be more relevant that information concerning a museum on the route). Each user has their own subjective properties (the subjective vector), which can be used to model the state of the user. The state of the user, the state of objects, and the medium within which the user-object interaction occurs can then be used to determine the focus and nimbus as discussed with respect to the spatial model of interaction. If the foci and nimbi intersect, the objects are capable of perceiving one another and can interact with one another. If an object is not perceivable or cannot be interacted with by the user, the virtual content data 515 for the object may be determined not to be relevant the user and is thus not included in the subset of virtual content data 515(A). If an object is perceivable or can be interacted with by the user, the virtual content data 515 for the object may be determined to be relevant the user and is thus included in the subset of virtual content data 515(A).

While information filtering determines the subset of virtual content data 515(A) that will be displayed, it is important to determine the format in which the subset of virtual content data 515(A) is to be communicated, and how to realize that format in detail. Registration accuracy, or how accurately the projected image of virtual content can be positioned, scaled, and oriented relative the real world, is an important factor in choosing the correct format for the virtual content. For example, in some extended reality applications such as a video game only a small number of content (real and/or virtual objects) are involved, such as superimposing an avatar, an application icon, or a menu on a single surface. In this case, the pose of the camera need only be calculated relative to that surface on which the content is to be projected. However, when the extended reality application (e.g., an augmented reality assistance application) involves more complex one-to-one relationships between an entity in the real-world and the corresponding object in the computer model (geo-referenced object), there is a need to estimate the pose of the camera in reference to a common coordinate system for better geo-referenced object registration in the real-world. Computer vision techniques, machine learning, and computing power have helped to develop applications with more precise registration between real world and virtual content.

However, these technologies may not always be able to achieve the necessary level of registration accuracy required for a given extended reality application. Therefore, if virtual content is always formatted in a way that assumes highly accurate registration, that information will not be presented effectively when registration accuracy decreases for whatever reason. To address this challenge, design module 525 may determine the current registration accuracy based on contextual information such as the available display resources and tracking accuracy (how accurately the client system tracks the position, orientation, and configuration of the objects in the physical environment over a sliding window of time), which, as the mobile user moves about, may vary for a variety of reasons that depend on the tracking technologies used. The design module then generates a preliminary format 540 in which the subset of virtual content data 515(A) should be displayed, based on the current registration accuracy. Specifically, this technique assembles the individual elements that comprise the subset of virtual content data 515(A) into the preliminary format 540 such that the client system can visualize virtual content as a cohesive interface from the elements (e.g., visually registered overlays, screen stabilized menus, and screen or body-stabilized display and interaction elements or augments) in response to the current registration accuracy.

No matter how well the virtual content filtering and design components work, the resulting display of virtual content might still be cluttered and hard to understand. This can occur when virtual content is positioned awkwardly and ambiguously in the user's view. For example, labels, augments, and applications might overlap each other, making them hard to decipher and unclear as to which of several objects they annotate, augment, or are applicable given the present task or goal of the user. Conventional systems address these challenges using algorithms that modify the virtual content from a spatial standpoint such as trying to ensure that virtual content correctly refer to the visible parts of physical objects as seen from the user's current viewpoint, and making sure that virtual content does not accidentally occlude each other or other important objects of which the user should be provided a clear view.

However, spatial solutions simply rearrange the virtual content within the view of the user to provide a more understandable interface display. The resulting display of virtual content might still be cluttered with too much virtual content. In order to address this challenge and others, the content visualization module 530 utilizes an inference engine 545 and adaptation module 550 to modify the preliminary format 540 of the subset of virtual content data 515(A) based on, not only the spatial aspects of the virtual content, but also temporal aspects of the virtual content. In other words, the content visualization module 530 identifies and prioritizes virtual content at each time step and displays prominently only that virtual content which is inferred to be of interest to the user at the present time or in the near future. As used herein, "of interest to the user" refers to content (e.g., media, software tools or games, tasks, goals, desires, and the like) the user wants to interact with at each time step and is determinable from the user's attention. As used herein, the user's "attention" refers to the behavior and/or mental state of the user. The interest of the user is inferred by the inference engine 545 based on features gathered from the user's attention (e.g., eye gaze, gestures, tasks, goals, interests, preferences, location, and other user context or environmental factors) in the input data. The content visualization module 530 then uses the adaptation module 550 to adapt the subset of virtual content data 515(A) based on the inferred content that is of interest to the user in order to generate a final format 555 of the subset of virtual content data 515(A). In some instances, the adaptation comprises modifying virtual content data (e.g., making relevant content more prominent) from the subset of virtual content data 515(A) based on the on the inferred content that is of interest to the user and generating the final format 555 of a subset of virtual content data 515(A). In some instances, the modifying comprises filtering virtual content data (e.g., removing non-relevant content) from the subset of virtual content data 515(A) based on the on the inferred content that is of interest to the user and generating the final format 555 of a subset of virtual content data 515(B). The subset of virtual content data 515(A)/(B) is integrated with the extended reality environment based on the final format 555 to ensure that the rendered virtual content 520 is arranged and visualized appropriately for consumption by the user.

The inference engine 545 uses rule-based artificial intelligence, machine learning based artificial intelligence, or a combination thereof to infer content that is of interest to the user. For example, rules, 560, algorithms 565 and/or models 570 of an artificial intelligence platform 575 may be configured to identify or learn the attention of the user and ultimately infer what content the user may be interested in at each time step. The rule-based inferencing is a deterministic approach by its very nature, meaning it operates on the simple yet effective cause and effect methodology (e.g. if X performs Y, then Z is the result). The user's position and orientation, inter-object occlusion relationships, and the role that the objects play in a specific task to be accomplished by the user, may all be taken into consideration by rules to determine whether and how virtual content data should be displayed. For example, a rule-based approach may be used to preferentially display relevant information to assist a user on repairing an automobile if the user pops open the hood of the automobile. In contrast, machine-learning based inferencing is a probabilistic approach that takes into account variations and probabilities to create informed results. This means that machine-learning based inferencing is capable of generalization, i.e., evolving, developing, and adapting when new information is added. The user's position and orientation, inter-object occlusion relationships, and the role that the objects play in a specific task to be accomplished by the user, may all be taken into consideration in order to learn a user's attention and infer what the user wants to interact with at a given point in time.

In some instances, the inference engine 545 uses a deep learning-based framework to accurately predict content that is of interest to the user based on features and feature-interactions gathered from the user's attention in the input data. To achieve this goal, the client system collects user behavior information (e.g., observed user activity) as a temporal sequence and uses a neural network such as one or more recurrent neural networks (e.g., a long short-term memory (LSTM)) to learn features and feature-interactions that represents a user's attention as latent features. The objective using historical user activities as a chronological sequence of requests before an arbitrary time step is to achieve the following two prediction tasks: (i) the probability that a user may interact with virtual content, and/or (ii) which type of virtual content a user may interact with at a given point in time. The probability that a user may interact with virtual content may be implemented as a binary classification problem; whereas which type of virtual content a user may interact may be implemented as a multi-classifier problem. The output of the neural network may include labels for the classes and a confidence score or accuracy metric derived for each class using, for example, accuracy (ACC), F1 Score, precision-recall (PR) area under the curve (AUC), receiver operating characteristic (ROC)/AUC, and the like. Although recurrent networks may be used for modeling these two problems it should be understood, that other models may be used such as a support vector machine (SVM), random forest, logistic regression, a convolutional neural network (CNN) or variant thereof, and a deep factorizing machine for the binary classification problem, and naive Bayes, random forest, logistic regression, SVM, and deep factorizing machine for the multi-classification problem.

Accordingly, the inference engine 545 is able to use historical and real-time data concerning the user's interactions with the extended reality environment in order to infer what the user wants to interact with at the present time or in the near future. For example, if a user is watching media on a display device such as a television or tablet, the inference engine 545 may infer based on past user behavior that the user most likely wants to have media control such as user interfaces and streaming service applications open and available while the user is focused on the television or tablet, but if the user is working on a proposal on a display device such as a laptop or tablet, the inference engine 545 may infer based on past behavior that the user most likely wants to have document editing tools such as interfaces and document applications open and available while the user is focused on the laptop or tablet but media control minimized. The inference engine 545 may also consider short term behavior such as eye gaze or gestures (e.g., micro gestures) to infer what the user wants to interact with at the present time or in the near future. For example, if a user walks into their greenhouse or garden, the inference engine 545 may infer based on a history of the user's actions in this location or the user's current eye gaze at plants that the user wants virtual content (e.g., watering information) concerning plants to be more prominent than any other virtual content. The inference engine 545 may also use a more fine grained inference process using rule-based artificial intelligence, machine learning based artificial intelligence, or a combination thereof, e.g., plants that are scheduled for an activity such as watering or feeding may be inferred as an interest of the user, and glimmers or augments may be displayed more prominently on those plants as compared to plants not scheduled for an activity.

Once the inference engine 545 has inferred content that is of interest to the user, the adaptation module 550 adapts the subset of virtual content data 515(A) based on the inferred content that is of interest to the user in order to generate the final format 555 of the subset of virtual content data 515(A). The adaptation of the subset of virtual content data 515(A) is implemented by identifying virtual content data from the subset of virtual content data 515(A) that is relevant, semi-relevant, non-relevant, or a combination thereof to the user, determining modifications to be applied to the relevant virtual content data, the semi-relevant virtual content data, the non-relevant virtual content data, or a combination thereof, and reformatting the subset of virtual content data 515(A) based on the modifications to generate the final format 555 of the subset of virtual content data 515(A). In some instances, the modifications comprise making relevant content more prominent such as changing a level of contrast or transparency, changing a position of the relevant content, scaling size, adding a sound notification, and the like. In certain instances, the modifications include filtering (i.e., removing) at least some of the non-relevant virtual content from the subset of virtual content data 515(A) and generating the final format 555 of a subset of virtual content data 515(B).

The determination of relevant, semi-relevant, or non-relevant virtual content data may be implemented using an objective and subjective property framework. Each user has their own objective properties (such as position and orientation) and subjective properties (that refer directly to the inferred content of interest). Analogous to the subjective vector (as discussed with respect to content planning module 510), an interest vector stores the relevance of tasks to the user's attention. A vector may be used because the user can carry out multiple tasks simultaneously, and, by assigning weights to those tasks, different interests can be indicated. The values for the interest vector may be obtained from the labels for the classes and optionally the accuracy metric output from the inference engine 545. For example, at a certain time a user may intend to navigate to a friend's house. However, the user may also intend to stop at the store to get the friend a birthday gift. Therefore, the two tasks (navigation and stopping at a store on the route) run concurrently and may be used to defined values for the interest vector. The interest vector may be supplemented by additional ancillary information. In the navigation task, the system may store the way points and the final destination of the route. In the store task, the system may store a location of the store on the route. In certain instances, the weights assigned the various classes or tasks are defined based on the accuracy metric for each.

A user's focus may be determined from the user's state and the medium within which a particular user—object interaction occurs. The user's state can be determined from their objective properties (including location) and their subjective properties (interest vector). A object's nimbus may be calculated as a function of the user's state, the object's state, and the medium. A virtual object's state may be defined with respect to a particular user, and depends on the object's objective properties and subjective properties. The object's subjective properties may be derived from the user's state and the object's objective properties determined beforehand by a domain expert. In one approach, the nimbus is a bounding box that quantifies the importance of the object to a specific user at a specific time. This bounding box may be determined by calculating the projection of the subjective vector into the user's interest vector.

Once the focus and the nimbus regions have been calculated, the level of interaction which occurs between a given focus and a nimbus is calculated. If the focus and nimbus regions do not overlap, the virtual content data associated with the object may be determined to be non-relevant. If the user's position lies inside the nimbus, then the virtual content data associated with the object may be determined to be relevant. If the focus and nimbus regions intersect, but the user's position lies outside the nimbus, then the virtual content data associated with the object may be determined to be semi-relevant (some level between relevant and non-relevant).

The determination of modifications to be applied to the relevant virtual content data, the non-relevant virtual content data, or a combination thereof may be implemented using a rule-based system. The rules are interpreted based on relevancy of the virtual content from the subset of virtual content data 515(A) as determined by the adaptation module 550. For example, a general rule may be defined as: virtual content determined to be relevant is displayed more prominent than virtual content determined to be non-relevant or semi-relevant. The modifications to the virtual content (to implement the prominence levels in accordance with the rule) may include changing a level of contrast or transparency, changing a position of the relevant content, scaling size, adding a sound notification, and the like. For example, general rules may be defined as: virtual content determined to be relevant maybe displayed at 80% size scaling; whereas virtual content determined to be non-relevant or semi-relevant is displayed at 40% size scaling. Alternatively, the general rules may be defined as: virtual content determined to be relevant maybe displayed at 80% size scaling; whereas virtual content determined to be non-relevant is filtered out or removed from the subset of virtual content data 515(A), and virtual content determined to be semi-relevant is displayed at 40% size scaling.

In some instances, the determination of modifications to be applied to the relevant virtual content data, the non-relevant virtual content data, or a combination thereof may be implemented using a rule-based system and/or threshold-based system. The rules and/or thresholds are interpreted based on: (i) relevancy of the virtual content from the subset of virtual content data 515(A) as determined by the adaptation module 550, and (ii) the accuracy of the predictions/classifications made by the inference engine 545 concerning the user's inferred attention or mental state. For example, rules may be defined as: if there is at least a 65% confidence score that the user's inferred attention or mental state (interest) is for a task, then virtual content determined to be relevant for that task is to be displayed at 80% size scaling with a highlight, if there is at least a 45% confidence score that the user's inferred attention or mental state (interest) is for a task, then virtual content determined to be relevant for that task is to be displayed at 80% size scaling, if there is less than a 45% confidence score that the user's inferred attention or mental state (interest) is for a task, then virtual content determined to be relevant for that task is to be displayed at 40% size scaling, and virtual content determined to be semi-relevant or non-relevant is filtered out or removed from the subset of virtual content data 515(A). Alternatively, the modifications may scaled based on the accuracy of the predictions/classifications made by the inference engine 545 concerning the user's inferred attention or mental state. For example, rules may be defined as: virtual content determined to be relevant for a task are to be displayed at a size scaling in accordance with the confidence score that the user's inferred attention or mental state (interest) is for that task (e.g., if the confidence is 80% then the size is scaled by 80% but if the confidence score is only 40% then the size is scaled by 40%), and virtual content determined to be semi-relevant or non-relevant is filtered out or removed from the subset of virtual content data 515(A).

Once the modifications are determined they are applied to the subset of virtual content data 515(A) in accordance with the rule-based system and/or threshold-based system to reformat the preliminary format 540 and generate the final format 555 of the subset of virtual content data 515(A)/(B) to be displayed to the user as virtual content 520 via the client system The virtual content 520 may be generated and rendered by the virtual content module 580, as described in detail with respect to FIGS. 2A, 2B, 3A, 3B, 4A, 4B, and 4C. For example, the virtual content module 580 may trigger generation and rendering of virtual content 520 by the client system (including virtual assistant application and I/O interfaces) based on a current field of view of user, as may be determined by real-time gaze tracking of the user, or other conditions. More specifically, image capture devices of the sensors capture image data representative of objects in the real world, physical environment that are within a field of view of image capture devices. During operation, the client system performs object recognition within image data captured by the image capture devices of HMD to identify objects in the physical environment such as the user, the user's hand, and/or physical objects. Further, the client system tracks the position, orientation, and configuration of the objects in the physical environment over a sliding window of time. Field of view typically corresponds with the viewing perspective of the HMD. In some examples, the extended reality application presents extended reality content comprising mixed reality and/or augmented reality. The extended reality application may render virtual content 520, such as virtual information or objects on a transparent display such that the virtual content 520 is overlaid on real-world objects, such as the portions of the user, the user's hand, physical objects, that are within a field of view of the user. In other examples, the extended reality application may render images of real-world objects, such as the portions of the user, the user's hand, physical objects, that are within field of view along with virtual content 520, such as virtual information or objects within extended reality content. In other examples, the extended reality application may render virtual representations of the portions of the user, the user's hand, physical objects that are within field of view (e.g., render real-world objects as virtual objects) within extended reality content.

Attention-Based Content Visualization Techniques

Figure 6:
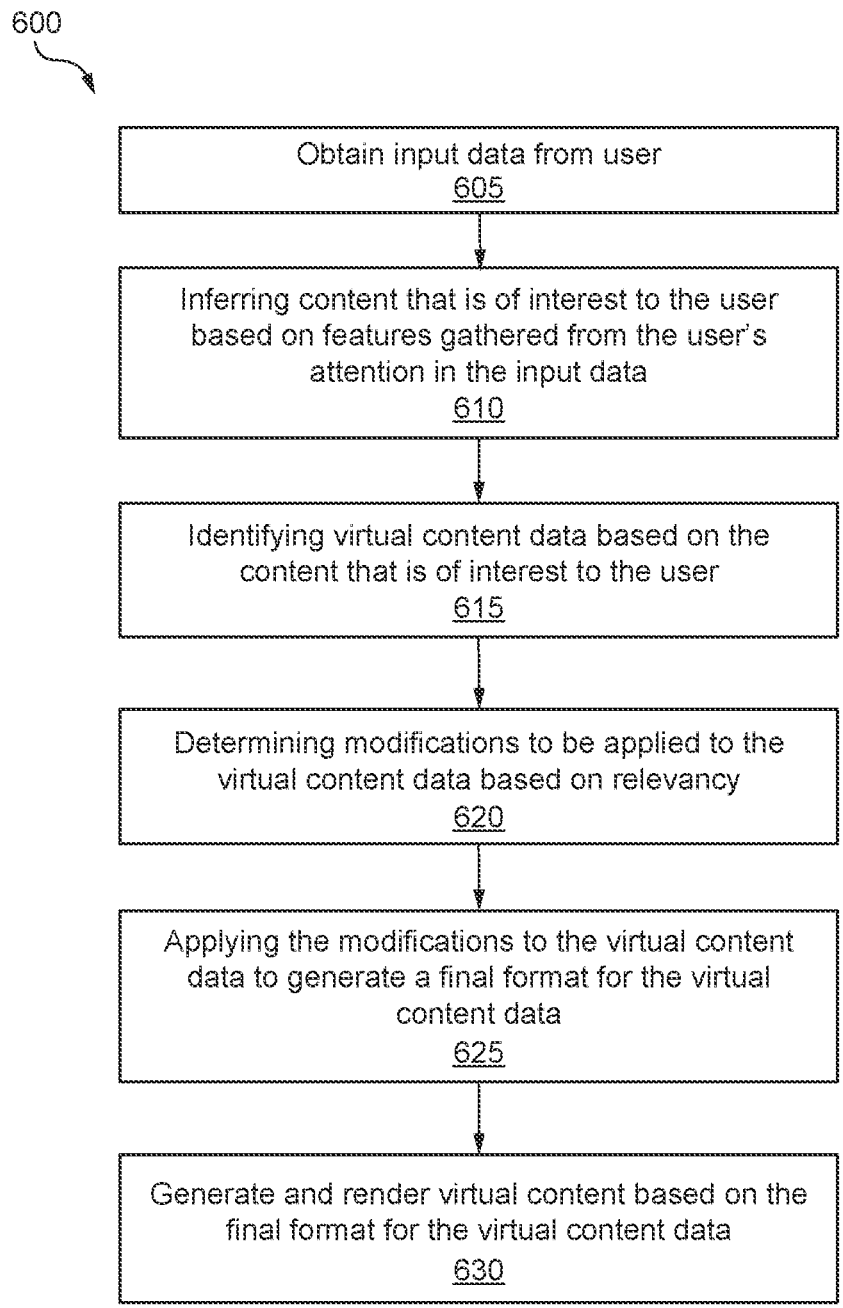
FIG. 6 is a flowchart illustrating a process for adaptively visualizing content in an artificial environment based on the attention of a user in accordance with various embodiments.

FIG. 6 is a flowchart illustrating a process 600 for adaptively visualizing content in an artificial environment based on the attention of a user according to various embodiments. The processing depicted in FIG. 6 may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 6 and described below is intended to be illustrative and non-limiting. Although FIG. 6 depicts the various processing steps occurring in a particular sequence or order, this is not intended to be limiting. In certain alternative embodiments, the steps may be performed in some different order or some steps may also be performed in parallel. In certain embodiments, such as in an embodiment depicted in FIGS. 1, 2A, 2B, 3A, 3B, 4A, 4B, 4C, and 5, the processing depicted in FIG. 6 may be performed by a client system implementing a content management pipeline to adaptively visualize content in an artificial environment based on the attention of a user.

At step 605, input data is obtained from a user. The input data includes a sequence of perceptions from a egocentric vision of the user.

At step 610, a rule-based artificial intelligence, machine learning based artificial intelligence, or a combination thereof infers content that is of interest to the user based on features gathered from the user's attention in the input data. In some instances, inferring is implemented by the machine learning based artificial intelligence performing two prediction tasks: (i) a probability that the user may interact with virtual content, and (ii) which type of virtual content the user may interact with at a given point in time. The probability that the user may interact with the virtual content is implemented as a binary classification problem and which type of the virtual content the user may interact is implemented as a multi-classifier problem. The output of the machine learning based artificial intelligence includes labels for classes and a confidence score or accuracy metric derived for each class.

At step 615, a set of virtual content data comprising relevant virtual content data, semi-relevant virtual content data, non-relevant virtual content data, or a combination thereof is identified based on the content that is of interest to the user. In some instances, identifying the set of virtual content data comprises determining a state of the user based on objective properties and subjective properties of the user, determining a focus of the user from the state of the user and a medium in which a particular interaction between the user and an object occurs within the input data, determining a nimbus of the object from the state of the user, a state of the object, and the medium, calculating a focus region based on the focus and nimbus region based on the nimbus, and when the focus and the nimbus regions do not overlap, virtual content data associated with the object is determined to be non-relevant, when a user's position lies inside the nimbus, then virtual content data associated with the object is determined to be relevant, and when the focus and nimbus regions intersect, but the user's position lies outside the nimbus, virtual content data associated with the object is determined to be semi-relevant At step 620, modifications to be applied to the relevant virtual content data, the semi-relevant virtual content data, the non-relevant virtual content data, or a combination thereof are determined based on relevancy of the virtual content data. In some instances, determining the modifications comprises interpreting one or more rules defined based on relevancy of the virtual content data and one or more modifications associated with the relevancy At step 625, the modifications are applied to the relevant virtual content data, the semi-relevant virtual content data, the non-relevant virtual content data, or a combination thereof in order to generate a final format for the set of virtual content. In some instances, the modifications comprise changing a level of contrast or transparency of the virtual content, changing a position of the virtual content, scaling size of the virtual content, adding a sound notification for the virtual content, or a combination thereof. In some instances, determining the modifications comprises interpreting one or more rules defined based on relevancy of the virtual content data, accuracy of the inference for the content that is of interest to the user, and one or more modifications associated with the relevancy and the accuracy.

At step 630, the virtual content is generated and rendered by the client system in the extended reality environment displayed to the user based on the final format for the set of virtual content. The virtual content rendered from the relevant virtual content data is more prominently displayed as compared to the virtual content rendered from the semi-relevant virtual content data and the non-relevant virtual content data.

Figure 7A:
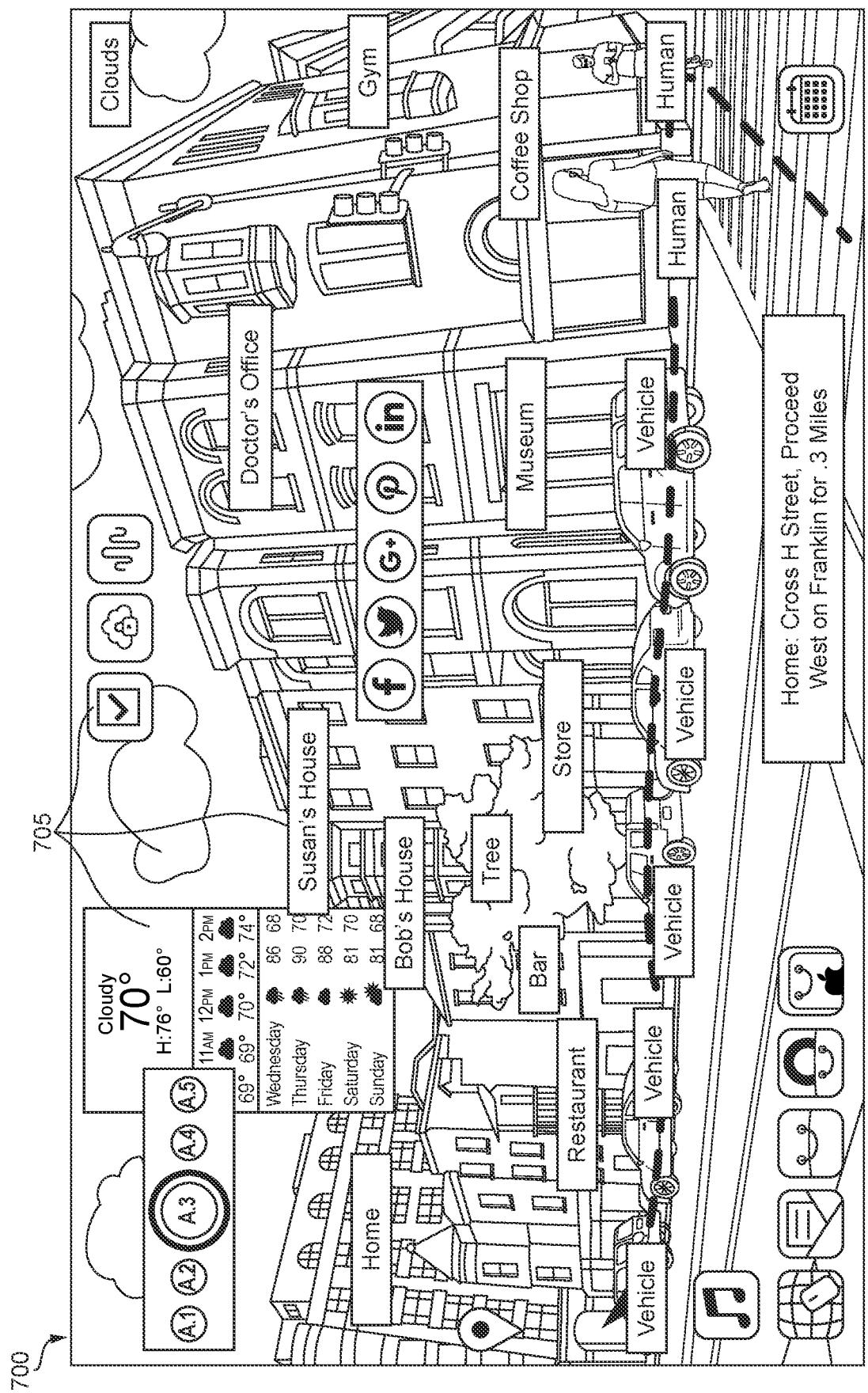
FIGS. 7A-7C illustrate visualizing content in an artificial environment in accordance with various embodiments.
Figure 7B:
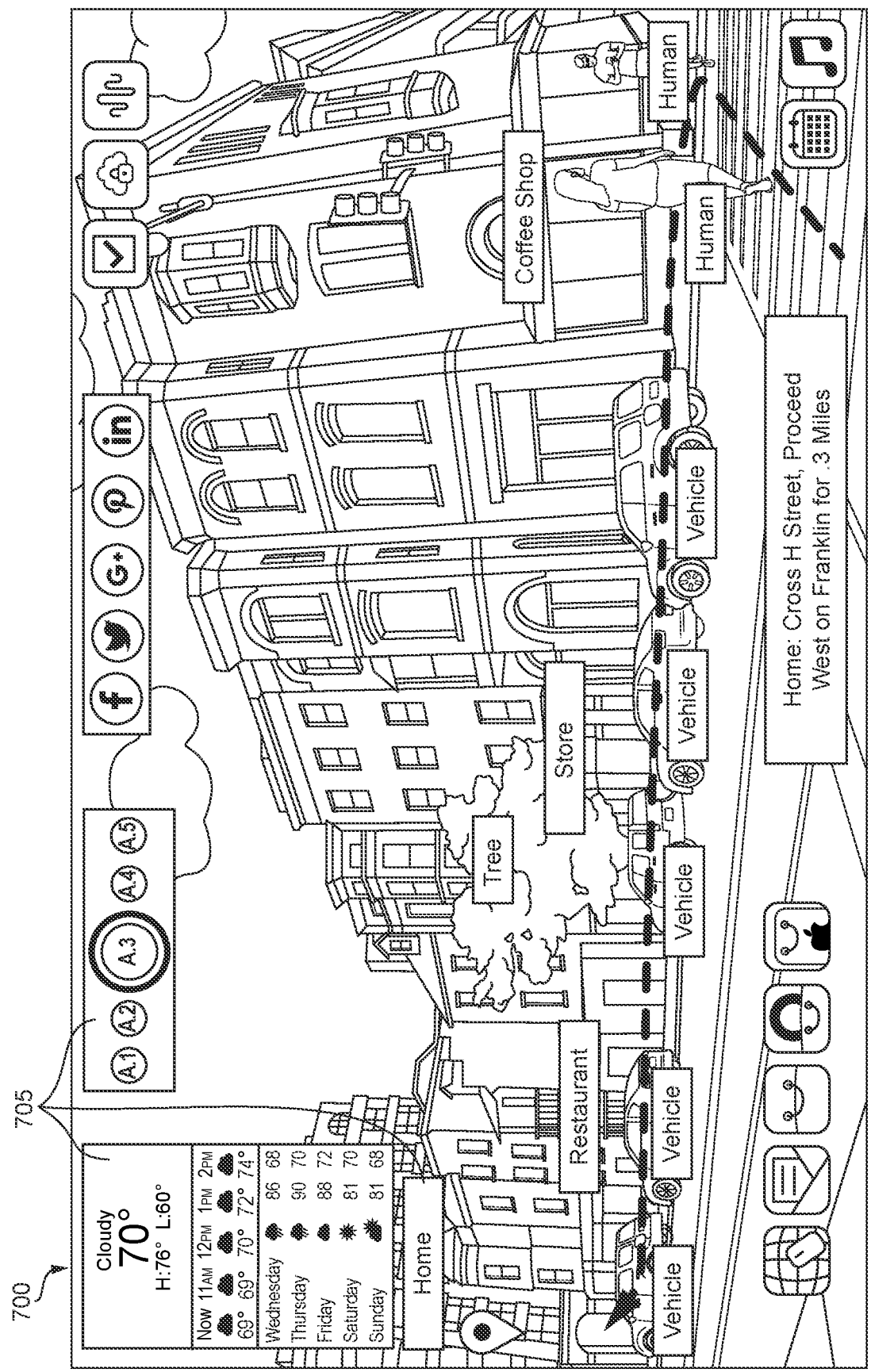
Figure 7C:
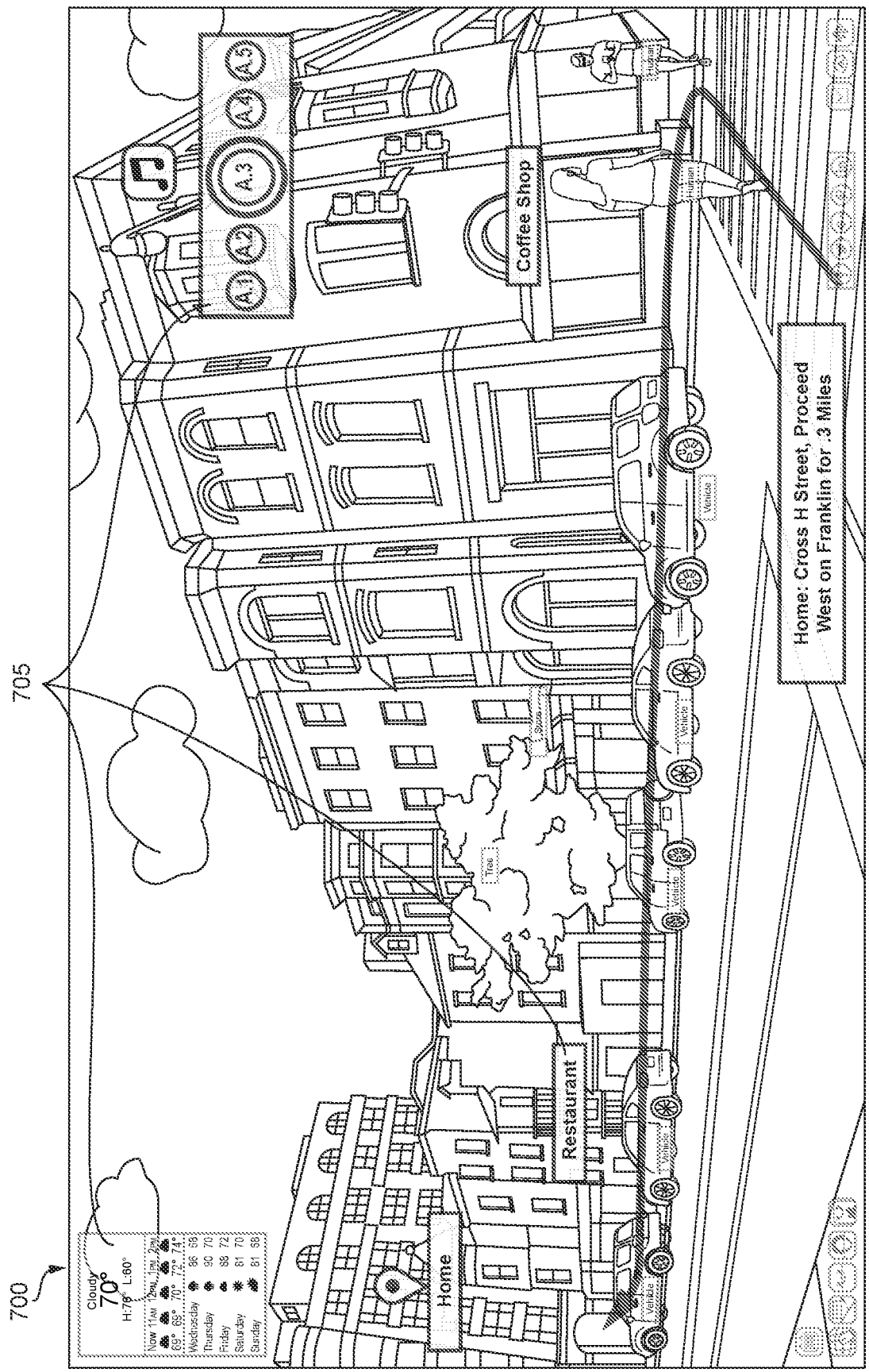

FIGS. 7A-7C illustrate visualizing content in an artificial environment 700 based on the attention of a user via process 600. FIG. 7A shows virtual content 705 rendered from virtual content data corresponding to various patterns, objects, locations, or other features within a sequence of perceptions $(x_1, \ldots, x_T)$ received for a given time step. In this particular instance, the content management pipeline is disabled such that the virtual content data is not filtered or modified prior to rendering the virtual content 705. The resulting display is highly cluttered; for example, virtual content is shown about the infrastructure of buildings obscured by the currently visible buildings, virtual content is shown for just about every object within the egocentric view of the user, virtual content is arbitrarily placed within the display, and all virtual content is shown in a relatively similar manner. FIG. 7B shows the effect of a conventional filter (i.e., a distance and visibility filter) and formatting (i.e., spatial formatting). The resulting display remains fairly cluttered; for example, virtual content 705 is shown for many of the objects within the egocentric view of the user, and all virtual content is shown in a relatively similar manner. In contrast, FIG. 7C shows the effect of adaptively visualizing the virtual content 705 based on the attention of a user (i.e., spatial and temporal formatting) in accordance with various embodiments described herein. The resulting display has been decluttered; for example, virtual content 705 rendered from relevant virtual content data is more prominently displayed as compared to the virtual content rendered from the semi-relevant virtual content data and the non-relevant virtual content data.

In the particular instance shown in FIG. 7C, the inference engine of the content management pipeline predicted the following content that is of interest to the user at the current time (with confidence score):
Task (1) Navigation Home—95%,
Task (2) Eating—73%,
Task (3) Gym—44%,
Task (4) Retail shopping—28%;
Interact with Music—79%,
Interact with Web browser—34%,
Interact with Weather Application—58%,
Interact with Calendar—23%,
Interact with Social Media—28%, Based on the content that is of interest to the user, the adaptation module identified virtual content data that could be relevant to the user and used the following rules to adapt the virtual content data for display to the user:
virtual content determined to be relevant is displayed at 80% size scaling with bold font and 10% transparency,
virtual content determined to be semi-relevant is displayed at 50% size scaling with 50% transparency,
virtual content determined to be non-relevant is displayed at 30% size scaling with 80% transparency, The adaptation module found that the virtual content pertaining to navigation home, eating lunch, and listening to music are most likely of interest to the user at the current time, and thus adapted virtual content data for those interactions to be formatted at 80% size scaling with bold font and with 10% transparency. The adaptation module found that the virtual content pertaining to the weather may be of some interest to the user at the current time, and thus adapted virtual content data for those interactions to be formatted at 50% size scaling with 50% transparency. The adaptation module found that the virtual content pertaining to the web, the user's calendar/schedule, the gym, other applications, and shopping was of no interest to the user at the current time, and thus adapted virtual content data for those interactions to be formatted at 30% size scaling with 80% transparency. As illustrated in FIG. 7C, the interface is much less cluttered as compared to the interface shown in FIGS. 7A and 7B, and the virtual content 705 rendered from relevant virtual content data is more prominently displayed as compared to the virtual content rendered from the semi-relevant virtual content data and the non-relevant virtual content data.

Figure 8A:
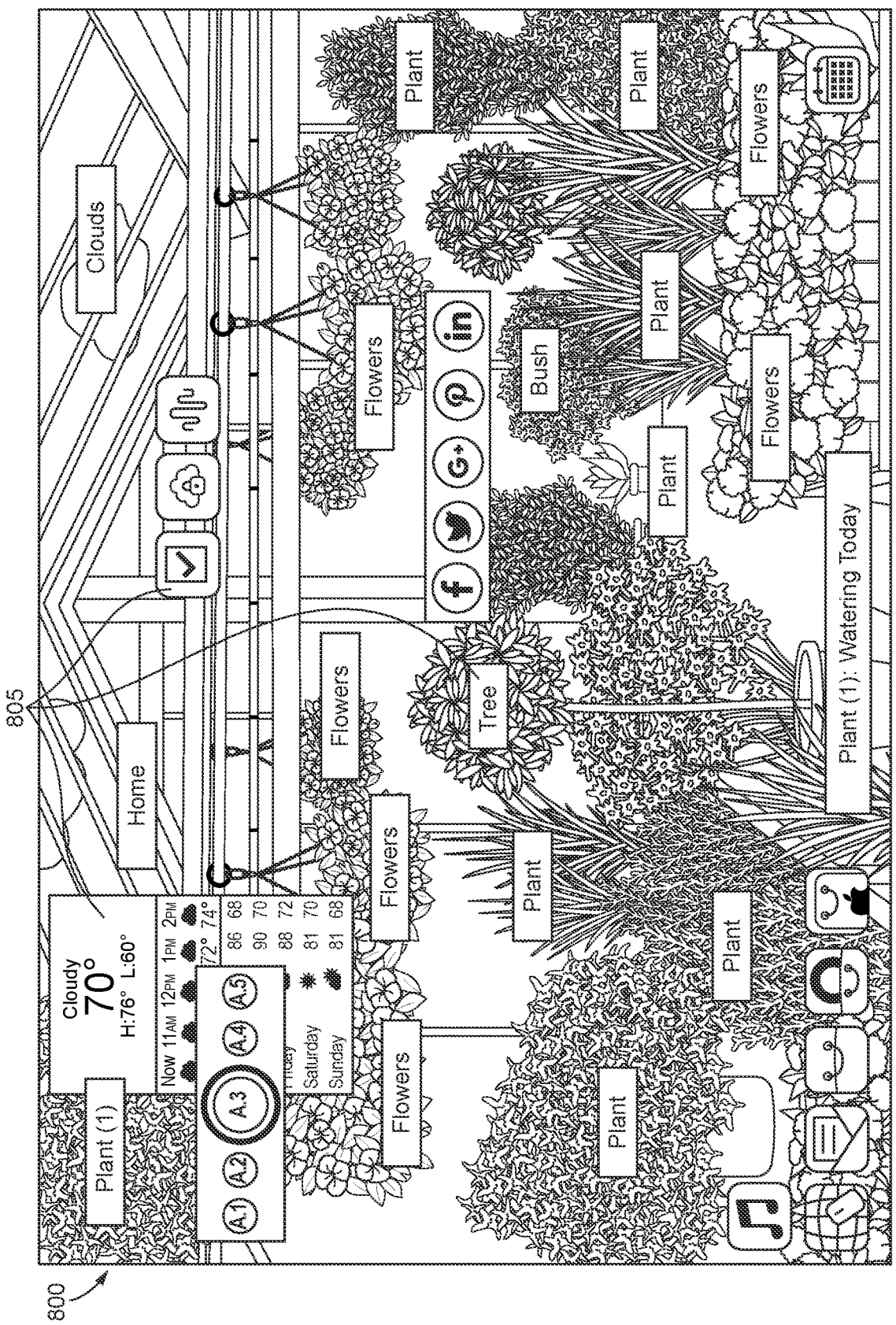
FIGS. 8A-8C illustrate visualizing content in an artificial environment in accordance with various embodiments.
Figure 8B:
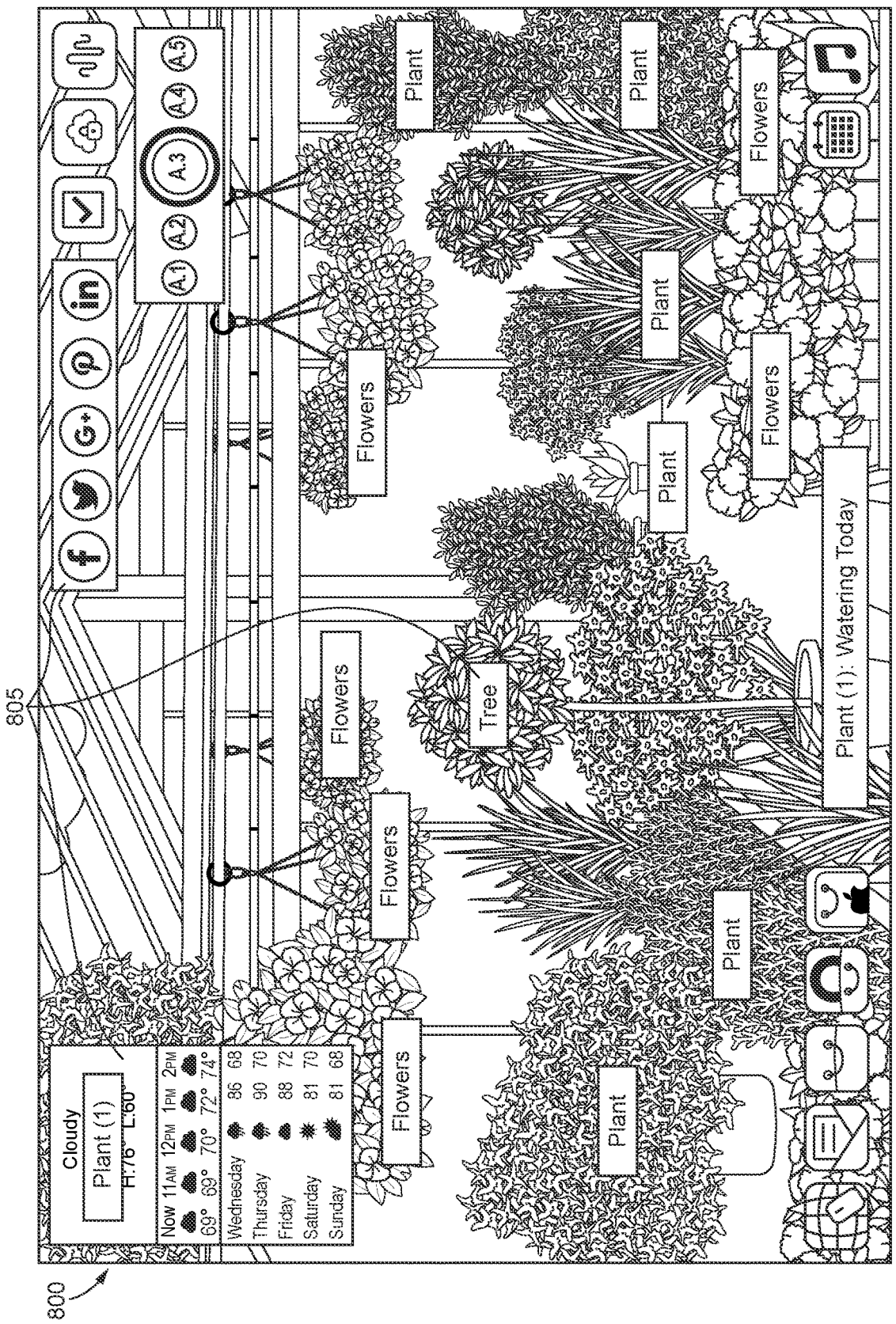
Figure 8C:
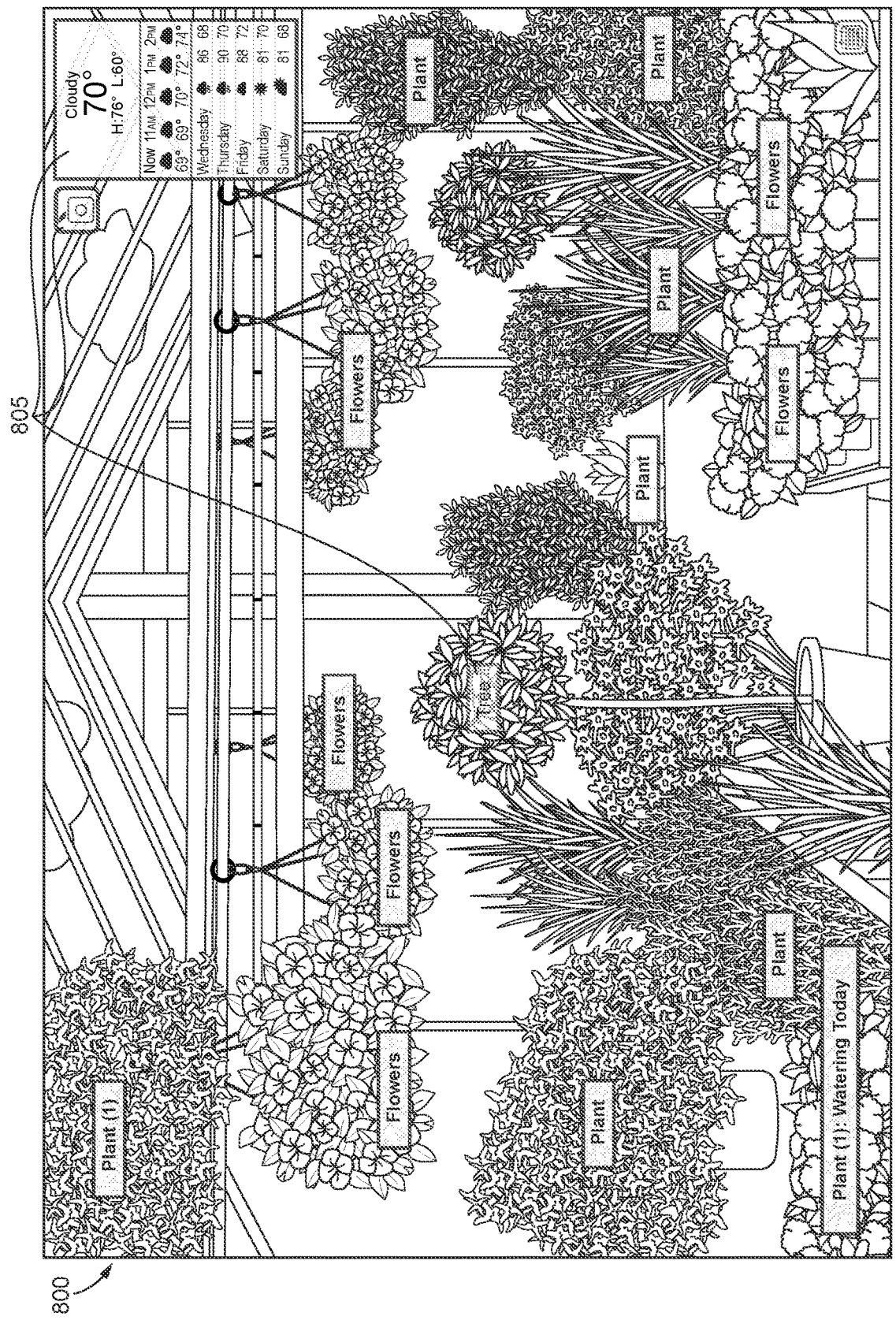

FIGS. 8A-8C illustrate visualizing content in an artificial environment 800 based on the attention of a user via process 600. FIG. 8A shows virtual content 805 rendered from virtual content data corresponding to various patterns, objects, locations, or other features within a sequence of perceptions $(x_1, \ldots, x_T)$ received for a given time step. In this particular instance, the content management pipeline is disabled such that the virtual content data is not filtered or modified prior to rendering the virtual content 805. The resulting display is highly cluttered; for example, virtual content is shown about the infrastructure of buildings obscured by the currently visible buildings, virtual content is shown for just about every object within the egocentric view of the user, virtual content is arbitrarily placed within the display, and all virtual content is shown in a relatively similar manner. FIG. 8B shows the effect of a conventional filter (i.e., a distance and visibility filter) and formatting (i.e., spatial formatting). The resulting display remains fairly cluttered; for example, virtual content 805 is shown for many of the objects within the egocentric view of the user, and all virtual content is shown in a relatively similar manner. In contrast, FIG. 8C shows the effect of adaptively visualizing the virtual content 805 based on the attention of a user (i.e., spatial and temporal formatting) in accordance with various embodiments described herein. The resulting display has been decluttered; for example, virtual content 805 rendered from relevant virtual content data is more prominently displayed as compared to the virtual content rendered from the semi-relevant virtual content data and the non-relevant virtual content data.

In the particular instance shown in FIG. 8C, the inference engine of the content management pipeline predicted the following content that is of interest to the user at the current time (with confidence score):
  Task (1) Gardening—97%,
  Task (2) Exercising—46%,
  Task (3) Eating—32%,
  Task (4) Retail shopping—12%;
  Interact with Music—44%,
  Interact with Plant Identifier—84%,
  Interact with Weather Application—74%,
  Interact with Calendar—63%,
  Interact with Social Media—23%, Based on the content that is of interest to the user, the adaptation module identified virtual content data that could be relevant to the user and used the following rules to adapt the virtual content data for display to the user:
  virtual content determined to be relevant is displayed at 80% size scaling with bold font and 40% transparency,
  virtual content determined to be semi-relevant is displayed at 50% size scaling with 70% transparency,
  virtual content determined to be non-relevant is removed from the display, The adaptation module found that the virtual content pertaining to gardening and the weather are most likely of interest to the user at the current time, and thus adapted virtual content data for those interactions to be formatted at 80% size scaling with bold font and with 40% transparency. The adaptation module found that the virtual content pertaining to the calendar or a schedule may be of some interest to the user at the current time, and thus adapted virtual content data for those interactions to be formatted at 50% size scaling with 70% transparency. The adaptation module found that the virtual content pertaining to the web, social media, music, eating, exercising, other applications, and shopping was of no interest to the user at the current time, and thus filtered out virtual content data for those interactions. As illustrated in FIG. 8C, the interface is much less cluttered as compared to the interface shown in FIGS. 8A and 8B, and the virtual content 805 rendered from relevant virtual content data is more prominently displayed as compared to the virtual content rendered from the semi-relevant virtual content data and the non-relevant virtual content data.

Figure 9A:
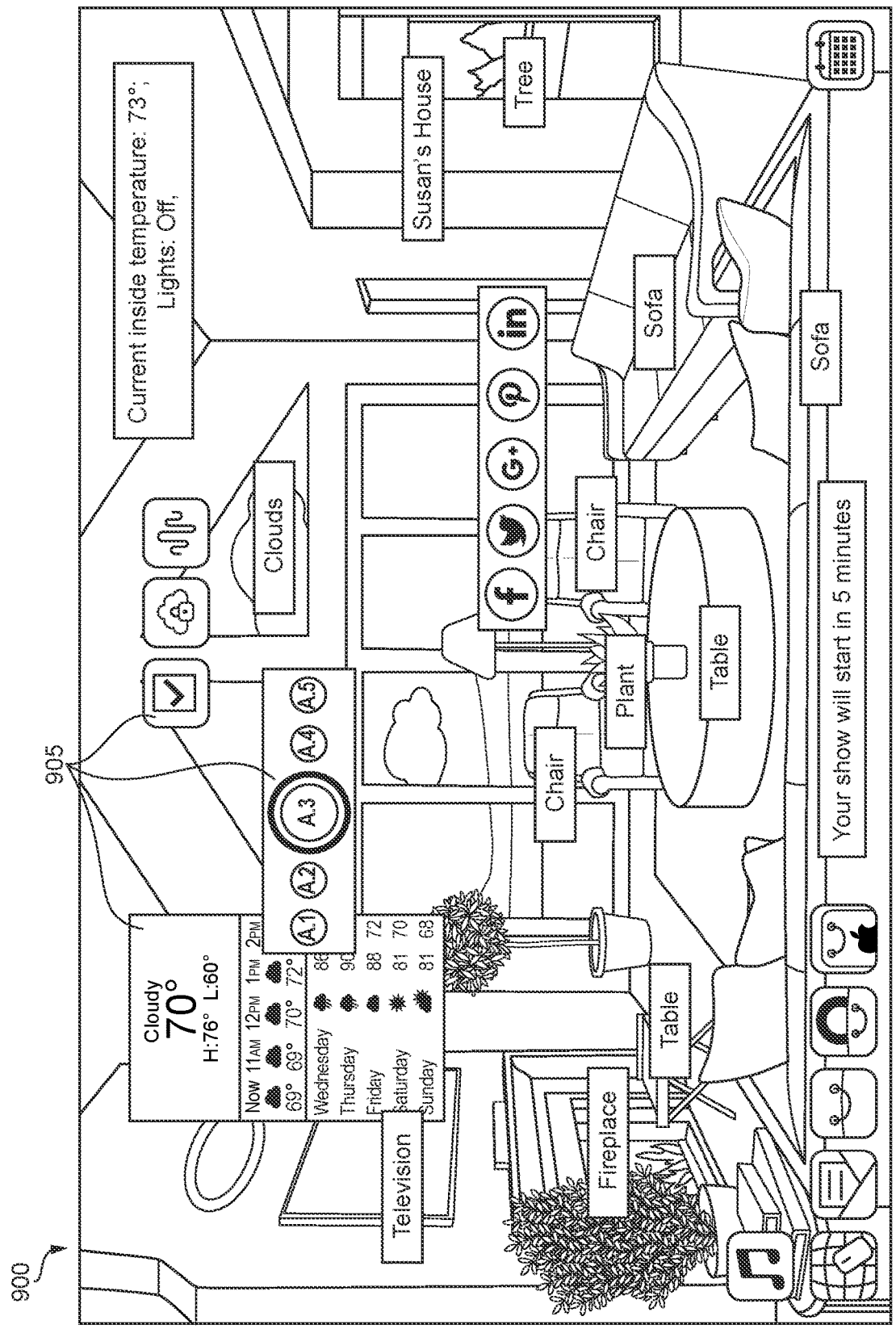
FIGS. 9A-9C illustrate visualizing content in an artificial environment in accordance with various embodiments.
Figure 9B:
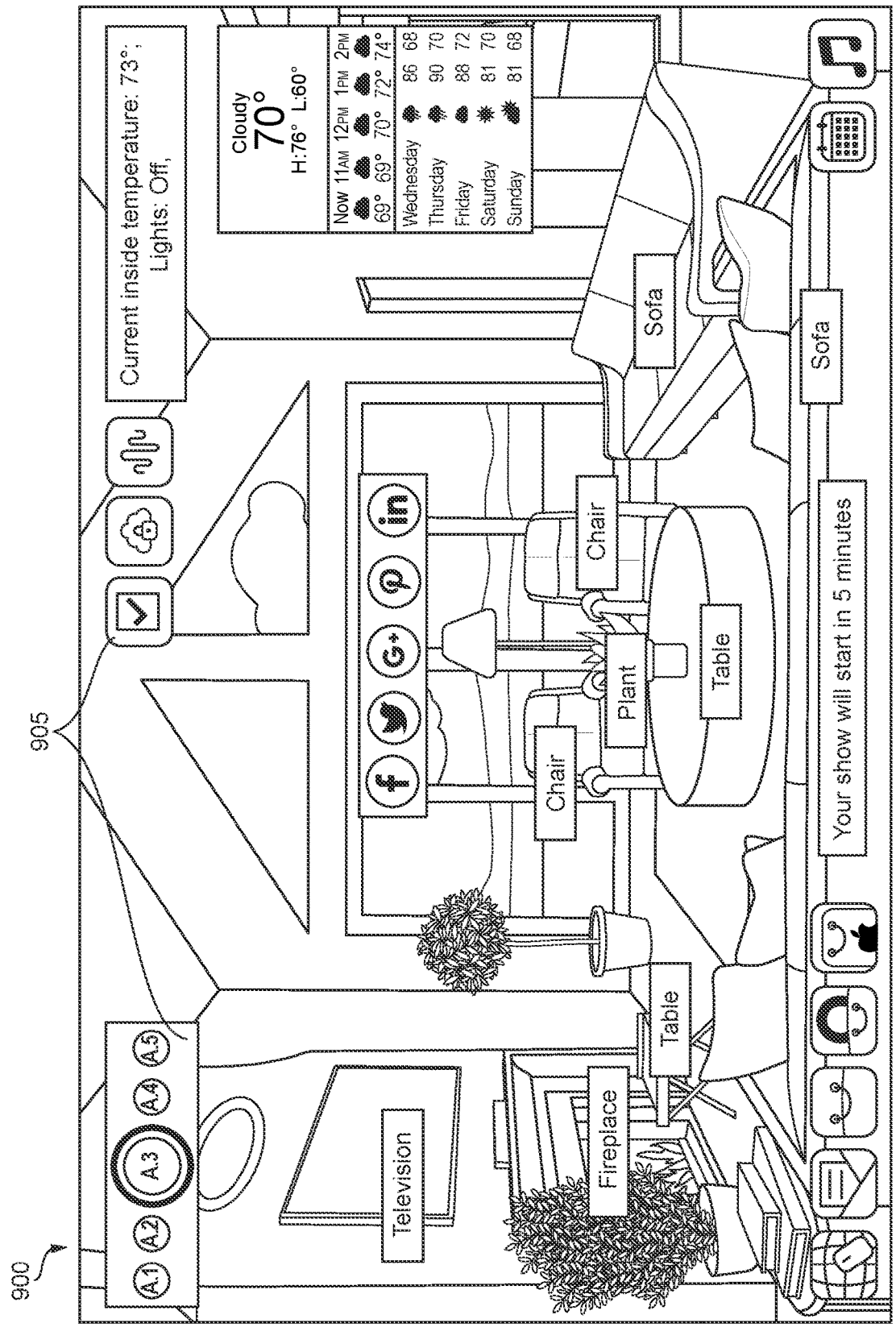
Figure 9C:
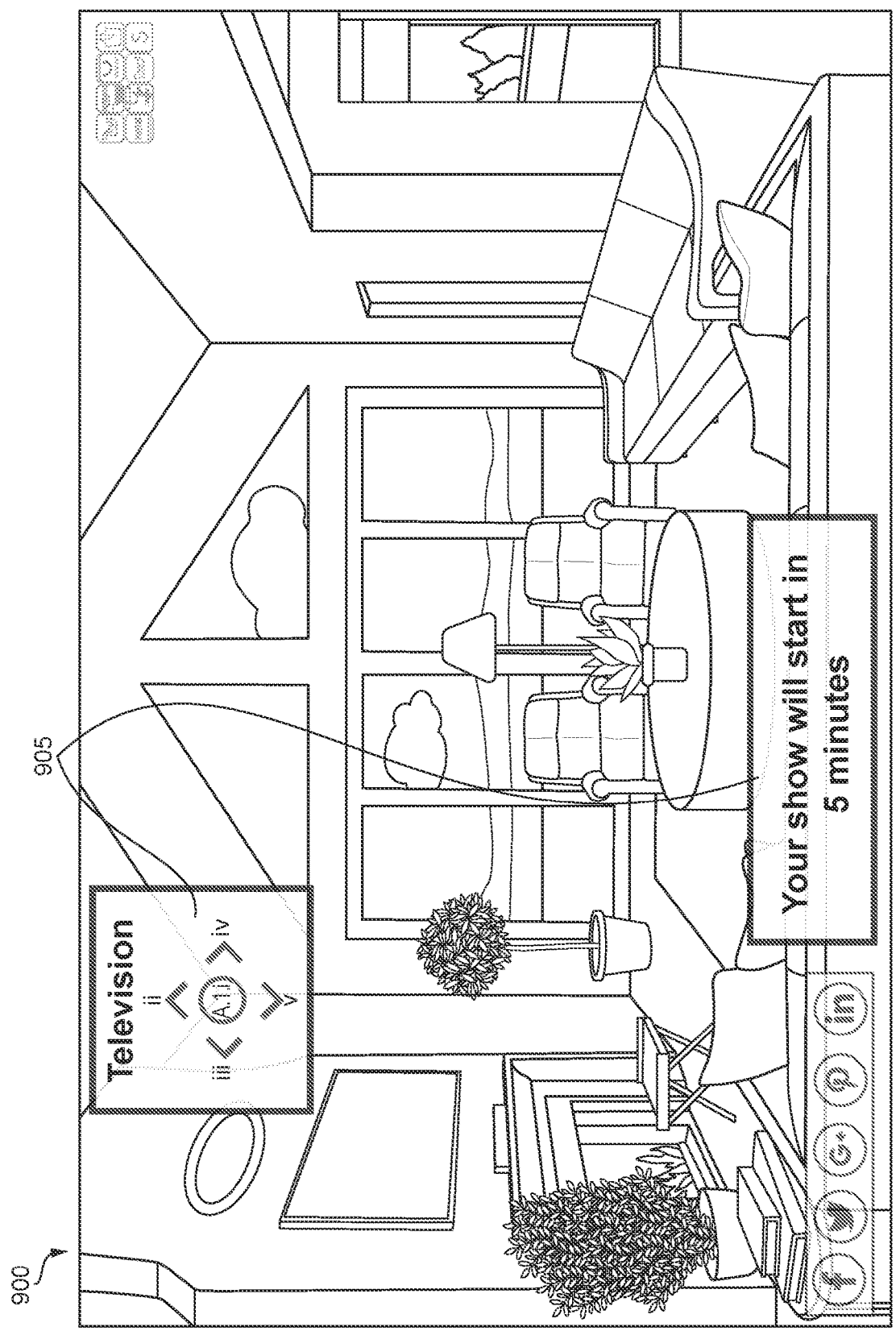

FIGS. 9A-9C illustrate visualizing content in an artificial environment 900 based on the attention of a user via process 600. FIG. 9A shows virtual content 905 rendered from virtual content data corresponding to various patterns, objects, locations, or other features within a sequence of perceptions $(x_1, \ldots, x_T)$ received for a given time step. In this particular instance, the content management pipeline is disabled such that the virtual content data is not filtered or modified prior to rendering the virtual content 905. The resulting display is highly cluttered; for example, virtual content is shown about the infrastructure of buildings obscured by the currently visible buildings, virtual content is shown for just about every object within the egocentric view of the user, virtual content is arbitrarily placed within the display, and all virtual content is shown in a relatively similar manner. FIG. 9B shows the effect of a conventional filter (i.e., a distance and visibility filter) and formatting (i.e., spatial formatting). The resulting display remains fairly cluttered; for example, virtual content 905 is shown for many of the objects within the egocentric view of the user, and all virtual content is shown in a relatively similar manner. In contrast, FIG. 9C shows the effect of adaptively visualizing the virtual content 905 based on the attention of a user (i.e., spatial and temporal formatting) in accordance with various embodiments described herein. The resulting display has been decluttered; for example, virtual content 905 rendered from relevant virtual content data is more prominently displayed as compared to the virtual content rendered from the semi-relevant virtual content data and the non-relevant virtual content data.

In the particular instance shown in FIG. 9C, the inference engine of the content management pipeline predicted the following content that is of interest to the user at the current time (with confidence score):
  Task (1) Watching TV—98%,
  Task (2) Exercising—36%,
  Task (3) Eating—32%,
  Task (4) Retail shopping—62%;
  Task (5) Work—49%;
  Interact with Music—38%,
  Interact with Weather Application—24%,
  Interact with Calendar—31%,
  Interact with Social Media—79%, Based on the content that is of interest to the user, the adaptation module identified virtual content data that could be relevant to the user and used the following rules to adapt the virtual content data for display to the user:
  virtual content determined to be relevant inside a building is displayed at size scaling based on the accuracy of the predictions/classifications and 40% transparency,
  virtual content determined to be semi-relevant inside a building is displayed at 40% size scaling with 70% transparency,
  virtual content determined to be non-relevant inside a building is removed from the display, The adaptation module found that the virtual content pertaining to watching TV and checking up with friends are most likely of interest to the user at the current time, and thus adapted virtual content data for those interactions to be formatted at size scaling based on the accuracy of the predictions/classifications and 40% transparency. The adaptation module found that the virtual content pertaining to shopping may be of some interest to the user at the current time, and thus adapted virtual content data for those interactions to be formatted at 40% size scaling with 70% transparency. The adaptation module found that the virtual content pertaining to the web, music, eating, exercising, other applications, and working was of no interest to the user at the current time, and thus filtered out virtual content data for those interactions. As illustrated in FIG. 9C, the interface is much less cluttered as compared to the interface shown in FIGS. 9A and 9B, and the virtual content 905 rendered from relevant virtual content data is more prominently displayed as compared to the virtual content rendered from the semi-relevant virtual content data and the non-relevant virtual content data.

Additional Considerations

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implement method comprising:
obtaining input data of a user, wherein the input data includes a sequence of perceptions from an egocentric vision of the user;
inferring, by rule-based artificial intelligence, machine learning based artificial intelligence, or a combination thereof, content that is of interest to the user based on features gathered from a user's attention in the input data;
determining, by using the content that is of interest to the user, relevant virtual content data, based on a user's position being inside a nimbus of an object, and at least one from among semi-relevant virtual content data and non-relevant virtual content data, wherein the semi-relevant virtual content data is determined when the user's position is outside the nimbus of the object and a focus region of the user and a nimbus region of the object intersect, and wherein the non-relevant virtual content data is determined when the focus region of the user and the nimbus region of the object do not overlap;

identifying a set of virtual content data to include the relevant virtual content data and the at least one from among semi-relevant virtual content data and non-relevant virtual content data;

determining modifications to be applied to the relevant virtual content data and the at least one from among the semi-relevant virtual content data and the non-relevant virtual content data based on relevancy of the virtual content data;

applying the modifications to the relevant virtual content data and the at least one from among the semi-relevant virtual content data and the non-relevant virtual content data, to generate a final format for the set of virtual content data; and rendering virtual content in an extended reality environment displayed to the user based on the final format for the set of virtual content data, wherein the virtual content rendered from the relevant virtual content data is more prominently displayed as compared to the virtual content rendered from the at least one from among the semi-relevant virtual content data and the non-relevant virtual content data.

2. The computer-implement method of claim 1, wherein the determining the relevant virtual content data and the at least one from among the semi-relevant virtual content data and the non-relevant virtual content data comprises:

determining a state of the user based on objective properties and subjective properties of the user, determining a focus of the user from the state of the user and a medium in which a particular interaction between the user and the object occurs within the input data, determining the nimbus of the object from the state of the user, a state of the object, and the medium, and calculating the focus region based on the focus and the nimbus region based on the nimbus.

3. The computer-implement method of claim 1, wherein determining the modifications comprises interpreting one or more rules defined based on the relevancy of the virtual content data and one or more modifications associated with the relevancy.

4. The computer-implement method of claim 1, wherein determining the modifications comprises interpreting one or more rules defined based on the relevancy of the virtual content data, accuracy of inference for the content that is of interest to the user, and one or more modifications associated with the relevancy and the accuracy.

5. The computer-implement method of claim 4, wherein the one or more modifications are scaled in accordance with the accuracy of inference for the content.

6. The computer-implement method of claim 1, wherein the modifications comprise changing a level of contrast or transparency of the virtual content, changing a position of the virtual content, scaling size of the virtual content, adding a sound notification for the virtual content, or a combination thereof.

7. A computer-implement method of claim 1, comprising:

obtaining input data of a user, wherein the input data includes a sequence of perceptions from an egocentric vision of the user;

inferring, by rule-based artificial intelligence, machine learning based artificial intelligence, or a combination thereof, content that is of interest to the user based on features gathered from a user's attention in the input data;

identifying a set of virtual content data comprising relevant virtual content data and at least one from among semi-relevant virtual content data and non-relevant virtual content data, based on the content that is of interest to the user;

determining modifications to be applied to the relevant virtual content data and the at least one from among the semi-relevant virtual content data and the non-relevant virtual content data, based on relevancy of the virtual content data;

applying the modifications to the relevant virtual content data and the at least one from among the semi-relevant virtual content data and the non-relevant virtual content data, to generate a final format for the set of virtual content data; and rendering virtual content in an extended reality environment displayed to the user based on the final format for the set of virtual content data, wherein the virtual content rendered from the relevant virtual content data is more prominently displayed as compared to the virtual content rendered from the at least one from among the semi-relevant virtual content data and the non-relevant virtual content data, wherein the inferring is implemented by the machine learning based artificial intelligence performing two prediction tasks: (i) a probability that the user may interact with virtual content, and (ii) which type of virtual content the user may interact with at a given point in time, wherein the probability that the user may interact with the virtual content is implemented as a binary classification problem and which type of the virtual content the user may interact is implemented as a multi-classifier problem, and wherein an output of the machine learning based artificial intelligence includes labels for classes and a confidence score or accuracy metric derived for each class.

8. An extended reality system comprising:

a head-mounted device comprising a display to display content to a user and one or more sensors to capture input data related to the user;

one or more processors; and one or more memories accessible to the one or more processors, the one or more memories storing a plurality of instructions that, when executed by the one or more processors, cause the one or more processors to perform processing including:

obtaining the input data, wherein the input data includes a sequence of perceptions from an egocentric vision of the user;

inferring, by rule-based artificial intelligence, machine learning based artificial intelligence, or a combination thereof content that is of interest to the user based on features gathered from a user's attention in the input data;

determining, by using the content that is of interest to the user, relevant virtual content data, based on a user's position being inside a nimbus of an object, and at least one from among semi-relevant virtual content data and non-relevant virtual content data, wherein the semi-relevant virtual content data is determined when the user's position is outside the nimbus of the object and a focus region of the user and a nimbus region of the object intersect, and wherein the non-relevant virtual content data is determined when the focus region of the user and the nimbus region of the object do not overlap;
identifying a set of virtual content data to include the relevant virtual content data and the at least one from among semi-relevant virtual content data and non-relevant virtual content data;
determining modifications to be applied to the relevant virtual content data and the at least one from among the semi-relevant virtual content data and the non-relevant virtual content data based on relevancy of the virtual content data;
applying the modifications to the relevant virtual content data and the at least one from among the semi-relevant virtual content data and the non-relevant virtual content data, to generate a final format for the set of virtual content data; and
rendering virtual content in an extended reality environment displayed to the user based on the final format for the set of virtual content data,
wherein the virtual content rendered from the relevant virtual content data is more prominently displayed as compared to the virtual content rendered from the at least one from among the semi-relevant virtual content data and the non-relevant virtual content data.

9. The extended reality system of claim 8, wherein the determining the relevant virtual content data and the at least one from among the semi-relevant virtual content data and the non-relevant virtual content data includes:
determining a state of the user based on objective properties and subjective properties of the user,
determining a focus of the user from the state of the user and a medium in which a particular interaction between the user and an object occurs within the input data,
determining the nimbus of the object from the state of the user, a state of the object, and the medium, and
calculating the focus region based on the focus and the nimbus region based on the nimbus.

10. The extended reality system of claim 8, wherein determining the modifications includes interpreting one or more rules defined based on relevancy of the virtual content data and one or more modifications associated with the relevancy.

11. The extended reality system of claim 8, wherein determining the modifications includes interpreting one or more rules defined based on relevancy of the virtual content data, accuracy of inference for the content that is of interest to the user, and one or more modifications associated with the relevancy and the accuracy.

12. The extended reality system of claim 11, wherein the one or more modifications are scaled in accordance with the accuracy of inference for the content.

13. The extended reality system of claim 8, wherein the modifications comprise changing a level of contrast or transparency of the virtual content, changing a position of the virtual content, scaling size of the virtual content, adding a sound notification for the virtual content, or a combination thereof.

14. An extended reality system comprising:
a head-mounted device comprising a display to display content to a user and one or more sensors to capture input data related to the user;
one or more processors; and
one or more memories accessible to the one or more processors, the one or more memories storing a plurality of instructions that, when executed by the one or more processors, cause the one or more processors to perform processing including:
obtaining the input data, wherein the input data includes a sequence of perceptions from an egocentric vision of the user;
inferring, by rule-based artificial intelligence, machine learning based artificial intelligence, or a combination thereof, content that is of interest to the user based on features gathered from a user's attention in the input data;
identifying a set of virtual content data comprising relevant virtual content data and at least one from among semi-relevant virtual content data and non-relevant virtual content data, based on the content that is of interest to the user;
determining modifications to be applied to the relevant virtual content data and the at least one from among the semi-relevant virtual content data and the non-relevant virtual content data, based on relevancy of the virtual content data;
applying the modifications to the relevant virtual content data and the at least one from among the semi-relevant virtual content data and the non-relevant virtual content data, to generate a final format for the set of virtual content data; and
rendering virtual content in an extended reality environment displayed to the user based on the final format for the set of virtual content data,
wherein the virtual content rendered from the relevant virtual content data is more prominently displayed as compared to the virtual content rendered from the at least one from among the semi-relevant virtual content data and the non-relevant virtual content data,
wherein the inferring is implemented by the machine learning based artificial intelligence performing two prediction tasks: (i) a probability that the user may interact with virtual content, and (ii) which type of virtual content the user may interact with at a given point in time,
wherein the probability that the user may interact with the virtual content is implemented as a binary classification problem and which type of the virtual content the user may interact is implemented as a multi-classifier problem, and
wherein an output of the machine learning based artificial intelligence includes labels for classes and a confidence score or accuracy metric derived for each class.

15. A non-transitory computer-readable memory storing a plurality of instructions executable by one or more processors, the plurality of instructions, when executed by the one or more processors, cause the one or more processors to perform operations including:
obtaining input data of a user, wherein the input data includes a sequence of perceptions from an egocentric vision of the user;
inferring, by rule-based artificial intelligence, machine learning based artificial intelligence, or a combination thereof, content that is of interest to the user based on features gathered from a user's attention in the input data;
determining, by using the content that is of interest to the user, relevant virtual content data, based on a user's position being inside a nimbus of an object, and at least one from among semi-relevant virtual content data and non-relevant virtual content data, wherein the semi-relevant virtual content data is determined when the user's position is outside the nimbus of the object and a focus region of the user and a nimbus region of the object intersect, and wherein the non-relevant virtual content data is determined when the focus region of the user and the nimbus region of the object do not overlap;

identifying a set of virtual content data to include the relevant virtual content data and the at least one from among semi-relevant virtual content data and non-relevant virtual content data based on the content that is of interest to the user;

determining modifications to be applied to the relevant virtual content data and the at least one from among the semi-relevant virtual content data and the non-relevant virtual content data based on relevancy of the virtual content data;

applying the modifications to the relevant virtual content data and the at least one from among the semi-relevant virtual content data and the non-relevant virtual content data, to generate a final format for the set of virtual content data; and rendering virtual content in an extended reality environment displayed to the user based on the final format for the set of virtual content data, wherein the virtual content rendered from the relevant virtual content data is more prominently displayed as compared to the virtual content rendered from the at least one from among the semi-relevant virtual content data and the non-relevant virtual content data.

16. The non-transitory computer-readable memory of claim 15, wherein the determining the relevant virtual content data and the at least one from among the semi-relevant virtual content data and the non-relevant virtual content data includes:

determining a state of the user based on objective properties and subjective properties of the user, determining a focus of the user from the state of the user and a medium in which a particular interaction between the user and an object occurs within the input data, determining the nimbus of the object from the state of the user, a state of the object, and the medium, and calculating the focus region based on the focus and the nimbus region based on the nimbus.

17. The non-transitory computer-readable memory of claim 15, wherein determining the modifications includes interpreting one or more rules defined based on the relevancy of the virtual content data and one or more modifications associated with the relevancy.

18. The non-transitory computer-readable memory of claim 15, wherein determining the modifications includes interpreting one or more rules defined based on relevancy of the virtual content data, accuracy of inference for the content that is of interest to the user, and one or more modifications associated with the relevancy and the accuracy.

19. The non-transitory computer-readable memory of claim 18, wherein the one or more modifications are scaled in accordance with the accuracy of the inference for the content.

20. A non-transitory computer-readable memory storing a plurality of instructions that, when executed by one or more processors, cause the one or more processors to perform operations including:

obtaining input data of a user, wherein the input data includes a sequence of perceptions from an egocentric vision of the user;

inferring, by rule-based artificial intelligence, machine learning based artificial intelligence, or a combination thereof, content that is of interest to the user based on features gathered from a user's attention in the input data;

identifying a set of virtual content data comprising relevant virtual content data and at least one from among semi-relevant virtual content data and non-relevant virtual content data, based on the content that is of interest to the user;

determining modifications to be applied to the relevant virtual content data and the at least one from among the semi-relevant virtual content data and the non-relevant virtual content data, based on relevancy of the virtual content data;

applying the modifications to the relevant virtual content data and the at least one from among the semi-relevant virtual content data and the non-relevant virtual content data, to generate a final format for the set of virtual content data; and rendering virtual content in an extended reality environment displayed to the user based on the final format for the set of virtual content data, wherein the virtual content rendered from the relevant virtual content data is more prominently displayed as compared to the virtual content rendered from the at least one from among the semi-relevant virtual content data and the non-relevant virtual content data, wherein the inferring is implemented by the machine learning based artificial intelligence performing two prediction tasks: (i) a probability that the user may interact with virtual content, and (ii) which type of virtual content the user may interact with at a given point in time, wherein the probability that the user may interact with the virtual content is implemented as a binary classification problem and which type of the virtual content the user may interact is implemented as a multi-classifier problem, and wherein an output of the machine learning based artificial intelligence includes labels for classes and a confidence score or accuracy metric derived for each class.

* * * * *